(12) United States Patent
Arai et al.

(10) Patent No.: US 10,639,919 B2
(45) Date of Patent: May 5, 2020

(54) INK SET AND IMAGE FORMING METHOD

(71) Applicant: FUJIFILM CORPORATION, Minato-ku, Tokyo (JP)

(72) Inventors: Takuya Arai, Kanagawa (JP); Hirohisa Hokazono, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 307 days.

(21) Appl. No.: 15/678,139

(22) Filed: Aug. 16, 2017

(65) Prior Publication Data

US 2018/0056691 A1    Mar. 1, 2018

(30) Foreign Application Priority Data

Aug. 31, 2016 (JP) ................. 2016-169839

(51) Int. Cl.
| | |
|---|---|
| C09D 11/54 | (2014.01) |
| C09D 11/101 | (2014.01) |
| C09D 11/106 | (2014.01) |
| C09D 11/322 | (2014.01) |
| C09D 11/324 | (2014.01) |
| C09D 11/38 | (2014.01) |
| C09D 11/40 | (2014.01) |
| B41M 5/00 | (2006.01) |
| B41M 7/00 | (2006.01) |
| C09D 11/52 | (2014.01) |
| C09D 11/12 | (2006.01) |

(52) U.S. Cl.
CPC ........ B41M 5/0023 (2013.01); B41M 7/0081 (2013.01); C09D 11/101 (2013.01); C09D 11/106 (2013.01); C09D 11/322 (2013.01); C09D 11/52 (2013.01); B41M 7/009 (2013.01); C09D 11/12 (2013.01); C09D 11/324 (2013.01); C09D 11/38 (2013.01); C09D 11/40 (2013.01)

(58) Field of Classification Search
None
See application file for complete search history.

(56) References Cited

U.S. PATENT DOCUMENTS

| | | | | |
|---|---|---|---|---|
| 9,011,590 B2* | 4/2015 | Arai | ..................... | C09D 11/322 106/31.6 |
| 9,951,239 B2* | 4/2018 | Arai | ..................... | C09D 11/102 |
| 10,174,218 B2* | 1/2019 | Shimono | ................... | B41J 2/01 |
| 2003/0092796 A1 | 5/2003 | Tsao et al. | | |
| 2010/0201736 A1 | 8/2010 | Ooishi et al. | | |
| 2012/0092427 A1 | 4/2012 | Ganapathiappan et al. | | |
| 2012/0128949 A1* | 5/2012 | Goto | ..................... | B41M 5/0017 428/207 |
| 2012/0320123 A1* | 12/2012 | Takeda | ................. | C09D 11/322 347/21 |
| 2013/0201252 A1* | 8/2013 | Namba | .................... | C09D 5/00 347/21 |
| 2015/0259567 A1* | 9/2015 | Tamai | .................. | C09D 175/04 347/21 |
| 2015/0267073 A1* | 9/2015 | Zhou | ...................... | B41M 5/502 428/205 |
| 2016/0002480 A1* | 1/2016 | Van Hameren | ........ | C09D 11/14 347/20 |
| 2016/0152858 A1* | 6/2016 | Visnyak | .............. | B41M 5/0011 347/21 |
| 2016/0185992 A1* | 6/2016 | Sarkisian | ............... | C09D 11/38 347/20 |
| 2016/0319147 A1* | 11/2016 | Chen | .................... | B41M 5/0017 |

FOREIGN PATENT DOCUMENTS

| | | |
|---|---|---|
| EP | 1586454 A1 | 10/2005 |
| EP | 2535379 A1 | 12/2012 |
| JP | 2002029141 A | 1/2002 |
| JP | 2003-326829 A | 11/2003 |
| JP | 2004261974 A | 9/2004 |
| JP | 2008230161 A | 10/2008 |
| JP | 2013018156 A | 1/2013 |
| JP | 2015-199780 A | 11/2015 |
| WO | 2015116029 A1 | 8/2015 |

OTHER PUBLICATIONS

Calcium propionate, National Center for Biotechnology Information, Pub Chem Database, Calcium propionate, CID=19999, https://pubchem.ncbi.nlm.nih.gov/compound/Calcium-propionate, no date available; 38 pages.*
English language translation of the following: Office action dated Jun. 25, 2019 from the JPO in a Japanese patent application No. 2016-169839 corresponding to the instant patent application.
Extended European Search Report dated Nov. 3, 2017, issued in corresponding EP Patent Application No. 17186398.8.

* cited by examiner

*Primary Examiner* — Helene Klemanski
(74) *Attorney, Agent, or Firm* — Solaris Intellectual Property Group, PLLC

(57) ABSTRACT

The invention provides an ink set and an image forming method in which excellent glossiness is obtained in a case where a surface of an image recording material on which an image is formed using an acidic pre-treatment liquid is overcoated. Namely, the invention provides an ink set and an image forming method using the same, the ink set including: an ink composition which includes a colorant and water; a pre-treatment liquid which contains an acid and water; and an overcoat liquid which includes water and particles of a resin, the resin containing an acidic group selected from the group consisting of a sulfo group, a salt of a sulfo group, a phosphonic acid group, a salt of a phosphonic acid group, a phosphoric acid group, and a salt of a phosphoric acid group.

5 Claims, No Drawings

INK SET AND IMAGE FORMING METHOD

CROSS-REFERENCE TO RELATED APPLICATION

This application claims priority under 35 USC 119 from Japanese Patent Application No. 2016-169839 filed on Aug. 31, 2016, the disclosure of which is incorporated by reference herein.

BACKGROUND OF THE INVENTION

1. Field of the Invention

The present disclosure relates to an ink set and an image forming method.

2. Description of the Related Art

A recording method that uses an inkjet method has been widely used since high-quality images can be recorded on various substrates by ejecting an ink in the form of droplets from multiple nozzles provided on an inkjet head. Image forming methods using an inkjet method in various forms have been suggested, and methods of using an ink set obtained by combining an ink containing a colorant with a pre-treatment liquid containing a compound which allows components in the ink to aggregate have been known. In this case, for example, a high-resolution image can be formed by bringing the ink and the pre-treatment liquid into contact with each other.

Meanwhile, there are several requirements for an image, and an image has been considered to be important in a high resolution, excellent color reproduction, photograph-like gloss feeling, and resistance to an external force (for example, scratch or abrasion) applied from the outside the image.

Particularly as a technique of improving the glossiness of an image from the description above, a technique of imparting high glossiness by applying an overcoat liquid onto an ink image and overcoating the image with the overcoat liquid has been known and a technique using a so-called aqueous varnish has been suggested.

As a specific example, an image is recorded by printing an image, using a black ink, on a recording medium coated with a reaction solution containing citric acid and printing a clear ink for which a resin particle dispersion is used on the entire surface of the recording medium is disclosed (for example, see JP2015-199780A). Further, as another example, a technique of recording an image with a pigment ink on a surface to be recorded of a recording medium coated with an aqueous treatment liquid containing a polyvalent metal salt such as magnesium chloride and resin particles, further coating the surface to be recorded with the same aqueous treatment liquid, and forming a film is disclosed (for example, see JP2003-326829A).

SUMMARY OF THE INVENTION

However, in JP2015-199780A, since the resin contained in the clear ink to be printed on an image contains acrylic acid containing a carboxy group, components of resin particles and the like in the clear ink are easily aggregated due to an acid in a reaction solution when an image is formed. Therefore, a high-gloss image cannot be obtained.

Further, in JP2003-326829A, a film of the aqueous treatment liquid is formed on the image recorded using a pigment ink, but the same liquid as the aqueous treatment liquid used for the pre-treatment is used to form the film and an aggregating agent contained in the aqueous treatment liquid is a polyvalent metal salt so that the aggregation force with respect to the components of the resin particles in the ink is weaker than the aggregation force in a case where the aggregating agent contains an acid. Therefore, a problem of a decrease in gloss of an image is unlikely to occur, but the sharpness of an image becomes insufficient.

Among commercially available products that are on the market as an overcoat liquid (aqueous varnish), there are many products in which components such as resin particles are stably dispersed due to carboxylic acid, and the components such as resin particles which are dispersed in an overcoat liquid can be easily aggregated due to an action of an acid in a case where an image is formed using the action of an acid contained in the pre-treatment liquid as an aggregating agent similar to a pigment or the like that is dispersed and contained in an ink. The overcoat liquid is thickened in a case where aggregation occurs in the overcoat liquid. In this manner, when the overcoat liquid is applied, unevenness occurs on the surface of a coated film and thus a problem of a decrease in gloss of the film becomes significant.

This is a phenomenon which may easily occur due to a non-curable water-based overcoat liquid (aqueous varnish). From the viewpoints of environmental suitability and safety in recent years, it is expected that a water-based overcoat liquid in which a thickening phenomenon caused by the aggregation is unlikely to occur is required.

Embodiments of the present invention have been made in consideration of the above-described problem, and the purpose thereof is to provide an ink set and an image forming method in which excellent glossiness is obtained in a case where an image forming surface of an image recording material on which an image is formed using an acidic pre-treatment liquid is overcoated. Further, an object of the present invention is to achieve the above-described purpose.

Specific means for solving the above-described problem includes the following aspects.

<1> An ink set, comprising: an ink composition comprising a colorant and water; a pre-treatment liquid comprising an acid and water; and an overcoat liquid comprising water and particles of a resin, the resin comprising an acidic group selected from the group consisting of a sulfo group, a salt of a sulfo group, a phosphonic acid group, a salt of a phosphonic acid group, a phosphoric acid group, and a salt of a phosphoric acid group.

<2> The ink set according to <1>, in which a total content A of the sulfo group, the salt of a sulfo group, the phosphonic acid group, the salt of a phosphonic acid group, the phosphoric acid group, and the salt of a phosphoric acid group in the resin contained in the particles is in a range of from 0.10 mmol to 1.8 mmol per 1 g of the resin.

<3> The ink set according to <1> or <2>, wherein the acidic group included in the resin includes at least one selected from the group consisting of a sulfo group or a salt of a sulfo group.

<4> The ink set according to any one of <1> to <3>, wherein the particles respectively comprise, in at least a part of a surface thereof, a surfactant comprising an acidic group selected from the group consisting of a sulfo group, a salt of a sulfo group, a phosphonic acid group, a salt of a phosphonic acid group, a phosphoric acid group, and a salt of a phosphoric acid group.

<5> The ink set according to <4>, wherein a total content B of the acidic group selected from the group consisting of a sulfo group, a salt of a sulfo group, a phosphonic acid group, a salt of a phosphonic acid group, a phosphoric acid group, and a salt of a phosphoric acid group, which is derived from the surfactant contained in the particles, is in a range of from 0.02 mmol to 0.30 mmol per 1 g of the resin.

<6> The ink set according to <4> or <5>, wherein the acidic group contained in the surfactant is a sulfo group or a salt of a sulfo group.

<7> The ink set according to any one of <4> to <6>, wherein a ratio of a total content B of a sulfo group, a salt of a sulfo group, a phosphonic acid group, a salt of a phosphonic acid group, a phosphoric acid group, and a salt of a phosphoric acid group, which are derived from the surfactant contained in the particles, per 1 g of the resin on a molar basis, to a total content A of a sulfo group, a salt of a sulfo group, a phosphonic acid group, a salt of a phosphonic acid group, a phosphoric acid group, and a salt of a phosphoric acid group in the resin contained in the particles, per 1 g of the resin on a molar basis, is in a range of from 0.1 to 0.8.

<8> The ink set according to any one of <1> to <7>, wherein the resin contained in the particles does not contain a carboxy group.

<9> An image forming method, comprising: a step of applying a pre-treatment liquid comprising an acid and water to an image recording material; applying, to a surface of the image recording material to which the pre-treatment liquid is applied, an ink composition comprising a colorant and water to form an image; and applying, to at least a part of a side of the image recording material on which the image is formed, an overcoat liquid comprising water and particles of a resin, the resin comprising an acidic group selected from the group consisting of a sulfo group, a salt of a sulfo group, a phosphonic acid group, a salt of a phosphonic acid group, a phosphoric acid group, and a salt of a phosphoric acid group.

According to the embodiments of the present invention, it is possible to provide an ink set and an image forming method in which excellent glossiness is obtained in a case where an image forming surface of an image recording material on which an image is formed using an acidic pre-treatment liquid is overcoated.

DESCRIPTION OF THE PREFERRED EMBODIMENTS

Hereinafter, an ink set according to an embodiment of the present invention and an image forming method using the ink set will be described in detail.

In the present specification, the numerical ranges shown using "from . . . to . . . " indicate ranges including the numerical values described before and after "to" as the lower limits and the upper limits.

Further, the concept of the term "step" in the present specification includes not only an independent step but also a step which cannot be clearly distinguished from other steps as long as the intended purpose of the step has been achieved.

In the present specification, the concept of the term "(meth)acryl" includes both of acryl and methacryl and the concept of the term "(meth)acryloyl" includes both of acryloyl and methacryloyl.

<Ink Set>

An ink set according to an embodiment of the present invention includes an ink composition which includes a colorant and water; a pre-treatment liquid which contains an acid and water; and an overcoat liquid which includes water and particles of a resin containing an acidic group selected from the group consisting of a sulfo group, a salt of a sulfo group, a phosphonic acid group, a salt of a phosphonic acid group, a phosphoric acid group, and a salt of a phosphoric acid group.

The ink set according to the embodiment of the present invention may further include other liquids in addition to those described above as necessary. Further, the ink set according to the embodiment of the present invention may include one ink composition, one pre-treatment liquid, and one overcoat liquid or may include two or more of at least one of the ink composition, the pre-treatment liquid, or the overcoat liquid.

From the past, a technique of performing an overcoat treatment on an image to improve the glossiness of the surface of an image recording material on a side with an image or the durability of the image has been known. For example, techniques of applying a liquid containing resin particles by means of dispersing the resin particles onto an image to improve the abrasion of the image or the resistance to water are disclosed in JP2015-199780A and JP2003-326829A.

In a method of using a pre-treatment liquid containing an aggregating agent that aggregates a pigment and the like in an ink composition together with the ink composition containing a pigment and the like among methods of forming an image according to an inkjet method, when the ink composition is jetted by being brought into contact with a pre-treatment liquid to form an image and then the image is overcoated with a liquid containing components such as resin particles, the components in the liquid used to overcoat the image are aggregated so that the liquid is thickened and, as the result, an effect of improving the gloss may be decreased in some cases. For example, in the polyvalent metal salt contained in an aqueous treatment liquid as an aggregating agent in JP2003-326829A, since an action of aggregating dispersed components is weaker than the action of an acid, it is expected that the thickening accompanied by the aggregation of components in the liquid used to overcoat the image is less. However, for example, in a case where an image formed on an image recording material which has been subjected to a pre-treatment is overcoated with a reaction solution containing an acid as in JP2015-199780A, there is a problem in that the thickening accompanied by the aggregation of components such as resin particles in the liquid used to overcoat the image becomes significant and, as the result, unevenness occurs on the overcoated surface and the effect of improving the gloss is significantly degraded.

In consideration of the above-described circumstances, in the ink set according to the embodiment of the present invention, a mode of selectively combining a water-based overcoat liquid containing particles of a resin which contains a strong acid group or a salt of the strong acid group as the liquid used to overcoat an image formed using an acid-containing treatment liquid in addition to a water-based pre-treatment liquid containing an acid (hereinafter, also referred to as an acid-containing treatment liquid) and an ink composition is employed.

According to the embodiment of the present invention, since the thickening accompanied by the phenomenon in which components in the overcoat liquid are aggregated due to the action of an acid of the acid-containing treatment liquid is suppressed even in a case where an image formed using the acid-containing treatment liquid is overcoated, occurrence of unevenness in the form of a strip or the like that contributes to a decrease in gloss is effectively suppressed. In this manner, it is possible to provide an ink set which is remarkably effective in improving the gloss by performing an overcoat treatment.

As described above, according to the ink set of the embodiment of the present invention, formation of a high-quality image using an acid-containing treatment liquid and improvement of glossiness through overcoating can be both achieved. Further, since an image is overcoated, a function of protecting the surface of the image is further improved.

Hereinafter, first, the overcoat liquid will be described in detail from among the ink composition, the pre-treatment liquid, and the overcoat liquid contained in the ink set according to the embodiment of the present invention and then the ink composition and the pre-treatment liquid will be described in detail.

—Overcoat Liquid—

The overcoat liquid contains water and particles of a resin containing an acidic group (hereinafter, also referred to as a "specific acidic group or the like") selected from the group consisting of a sulfo group, a salt of a sulfo group, a phosphonic acid group, a salt of a phosphonic acid group, a phosphoric acid group, and a salt of a phosphoric acid group and may further contain other components as necessary.

Since the overcoat liquid according to the embodiment of the present invention is a water-based liquid and contains particles of a resin containing a specific acidic group or the like which is a strong acid group or a salt of the strong acid group, the glossiness of a surface on which an image is formed in a case where the image is formed using an acid-containing treatment liquid becomes excellent.

(Particles of Resin)

The overcoat liquid contains at least one kind of particles of a resin containing an acidic group (specific acidic group or the like) selected from the group consisting of a sulfo group ($-SO_3H$), a salt of a sulfo group, a phosphonic acid group ($-P(=O)(OH)_2$), a salt of a phosphonic acid group, a phosphoric acid group ($-OP(=O)(OH)_2$), and a salt of a phosphoric acid group.

~Resin in Particles~

A resin forming particles is not particularly limited as long as the resin is a water-insoluble or sparingly soluble resin (hereinafter, a resin forming particles is also referred to as a "water-insoluble resin") which contains a specific acidic group or the like and can be selected from among known resins as appropriate.

Here, the expression "insoluble or sparingly soluble in water" indicates that the dissolution amount of a resin is 15 g or less in a case where the resin is dissolved in 100 g of water at 25° C. after being dried at 105° C. for 2 hours similar to resin particles described below. From the viewpoint of improving the continuous jetting properties and jetting stability of an ink, the dissolution amount thereof is preferably 10 g or less, more preferably 5 g or less, and still more preferably 1 g or less. The dissolution amount indicates a dissolution amount obtained by neutralizing the resin particles at a neutralization degree of 100% with sodium hydroxide or acetic acid depending on the type of a salt-forming group of the resin particles which are insoluble or sparingly soluble in water.

The particles of a water-insoluble resin may be used in the form of a dispersion (an aqueous dispersion which is referred to as a so-called latex) formed by particles being dispersed in an aqueous medium.

The water-insoluble resin of the water-insoluble resin particles is a polymer containing at least a constitutional unit (first constitutional unit) derived from a monomer that contains at least one group (specific acidic group or the like) selected from the group consisting of a sulfo group ($-SO_3H$), a salt of a sulfo group, a phosphonic acid group ($-P(=O)(OH)_2$), a salt of a phosphonic acid group, a phosphoric acid group ($-OP(=O)(OH)_2$), and a salt of a phosphoric acid group.

The first constitutional unit may be a constitutional unit containing only one selected from the specific acidic group and the like or a constitutional unit containing two or more selected from the specific acidic group and the like.

It is preferable that the water-insoluble resin has a constitutional unit (second constitutional unit) derived from a monomer containing an aromatic ring structure in addition to the first constitutional unit and may further have a constitutional unit derived from a monomer other than the first constitutional unit and the second constitutional unit as necessary.

——First Constitutional Unit——

—[Constitutional Unit Derived from Monomer Containing Sulfo Group or Salt of Sulfo Group]—

In a case where a constitutional unit derived from a first monomer contains at least one of a sulfo group or a salt of a sulfo group, the constitutional unit derived from the first monomer is a constitutional unit present in a resin by means of polymerizing (in some cases, copolymerizing the first monomer with at least a second monomer described below) the first monomer containing at least one group selected from a sulfo group or a salt of a sulfo group. The effect of improving the glossiness through overcoating becomes excellent when the first monomer is copolymerized to contain a sulfo group or a salt of a sulfo group.

The first monomer containing at least one of a sulfo group or a salt of a sulfo group is not particularly limited as long as the monomer contains a sulfo group or a salt of a sulfo group or a sulfo group and a salt of a sulfo group. The constitutional unit derived from the first monomer may be appropriately selected from the group consisting of a constitutional unit derived from a monomer containing a sulfo group or a salt of a sulfo group and a constitutional unit derived from a monomer containing a sulfo group and a salt of a sulfo group. The first monomer may be used alone or in combination of two or more kinds thereof.

Among the constitutional units, a constitutional unit represented by Formula 1 is preferable as the constitutional unit derived from the first monomer containing at least one of a sulfo group or a salt of a sulfo group.

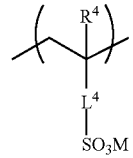

Formula 1

In Formula 1, $R^4$ represents a methyl group or a hydrogen atom.

Further, $L^4$ in Formula 1 represents a divalent linking group formed by linking one or two or more selected from the group consisting of a single bond, a chain-like, branched, or cyclic alkylene group having 1 to 5 carbon atoms, an arylene group having 6 to 10 carbon atoms, $-O-$, $-NH-$, $-S-$, $-C(=O)-$, and $-CH(OH)-$.

$L^4$ represents preferably a divalent linking group formed by linking one or two or more selected from the group consisting of a chain-like, branched, or cyclic alkylene group having 1 to 5 carbon atoms, an arylene group having 6 to 10 carbon atoms, —O—, —NH—, and —C(=O)—. $L^4$ more preferably represents: a divalent linking group formed of a chain-like, branched, or cyclic alkylene group having 1 to 5 carbon atoms, an arylene group having 6 to 10 carbon atoms, or a divalent linking group formed by a chain-like, branched, or cyclic alkylene group having 1 to 5 carbon atoms, —O— and —C(=O)—; or a divalent linking group formed of a chain-like, branched, or cyclic alkylene group having 1 to 5 carbon atoms, —NH—, and —(C=O)—.

$L^4$ represents still more preferably at least one linking group selected from the following group a. In the linking groups of the group a, n represents an integer of 1 to 5 and the symbol "*" represents a binding position.

[Group a]

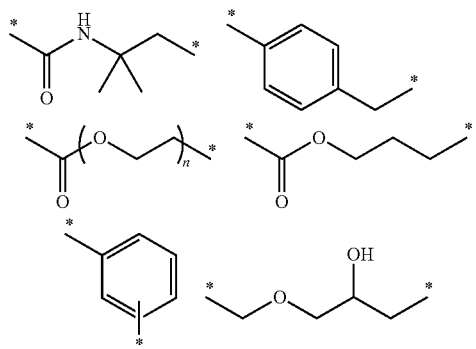

In Formula 1, M represents a hydrogen atom or a cation.

Examples of the cation as M include alkali metal ions such as a sodium (Na) ion, a potassium (K) ion, and a lithium (Li) ion; alkaline earth metal ions such as a calcium (Ca) ion and a magnesium (Mg) ion; and ions such as an ammonium (Al) ion.

Examples of the constitutional unit represented by Formula 1 include constitutional units derived from monomers containing acrylamide-2-methylpropanesulfonic acid, acrylamido-2-propanesulfonic acid, vinylsulfonic acid, styrenesulfonic acid, α-methyl styrenesulfonic acid, 2-sulfoethyl (meth)acrylate, 3-sulfopropyl (meth)acrylate, methacryloyloxyethyl sulfonic acid, vinylbenzyl sulfonic acid, 1-allyloxy-2-hydroxypropyl sulfonic acid, allyloxypolyethylene glycol (the polymerization degree of an ethylene glycol moiety: 10) sulfonic acid, and salts of these.

Further, examples of counter ions of the salts include alkali metal ions such as a Na ion, a K ion, and a Li ion; alkaline earth metal ions such as a Ca ion and a Mg ion; and ions such as an Al ion.

As the monomers containing a sulfo group or a salt of a sulfo group, commercially available monomers that are on the market may be used and examples thereof include an aqueous solution containing 50% by mass of sodium acrylamide-2-methylpropanesulfonate (manufactured by Sigma-Aldrich Co. LLC.) and sodium p-styrenesulfonate (SPINOMER NaSS) (manufactured by TOSOH ORGANIC CHEMICAL CO., LTD.).

In addition, as a method of introducing at least one of a sulfo group or a salt of a sulfo group into a water-insoluble resin, a monomer having at least one group selected from a sulfo group or a salt of a sulfo group may be copolymerized. Further, a monomer containing a sulfo group is copolymerized and water-insoluble resin particles are synthesized and neutralized using a base to obtain a salt of a sulfo group in a case where a salt of a sulfo group is introduced into the water-insoluble resin particles.

Among the constitutional units derived from monomers having at least one of a sulfo group or a salt of a sulfo group, constitutional units derived from acrylamide-2-methylpropanesulfonic acid, a salt of acrylamide-2-methylpropanesulfonic acid, styrenesulfonic acid, α-methylstyrenesulfonic acid, or 3-sulfopropyl (meth)acrylate are preferable. Further, as counter ions of the salts, a Na ion, a K ion, a Li ion, and an Al ion are preferable.

Among these, acrylamide-2-methylpropanesulfonic acid and styrenesulfonic acid are more preferable.

Hereinafter, specific examples of the constitutional units derived from monomers containing at least one of a sulfo group or a salt of a sulfo group will be described. However, the embodiment of the present invention is not limited to the following specific examples.

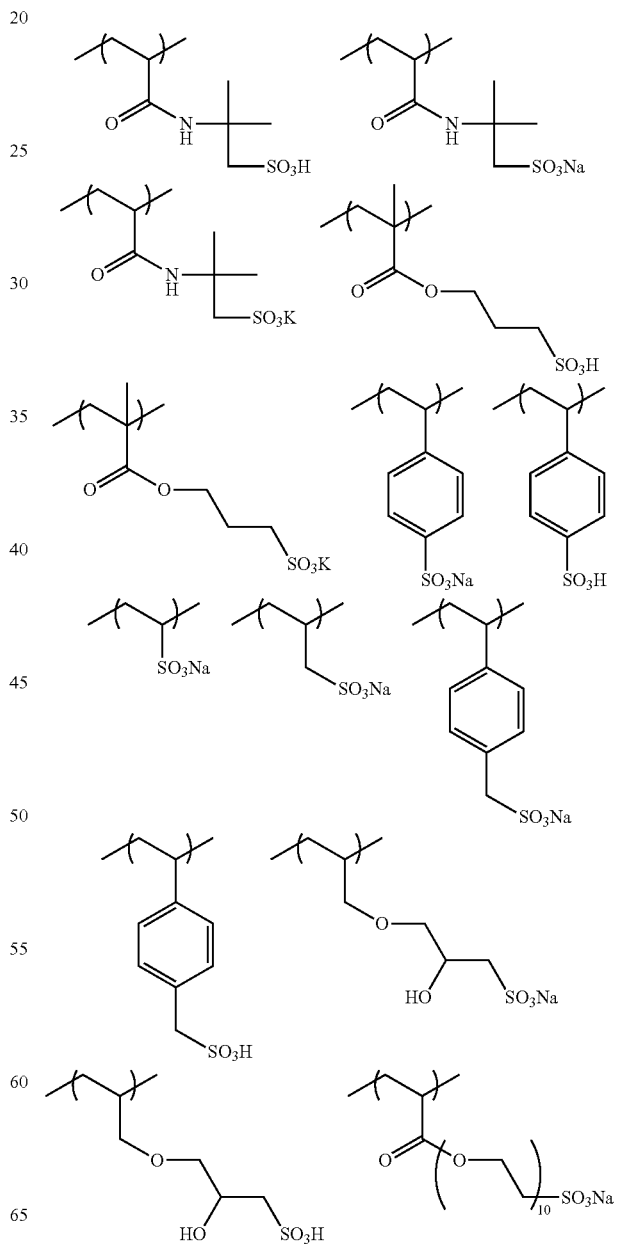

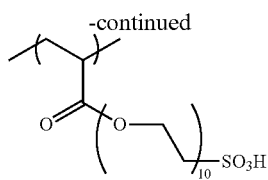

The content of at least one of a sulfo group or a salt of a sulfo group in the water-insoluble resin contained in particles is preferably in a range of from 0.05 mmol to 2.0 mmol, more preferably in a range of from 0.10 mmol to 1.8 mmol, and still more preferably in a range of from 0.5 mmol to 1.7 mmol per 1 g of the resin. When the content of the sulfo group or the like in the resin is 0.05 mmol or greater, the gloss is further improved and the presence of the sulfo group and the salt of the sulfo group, which are stabilized groups, is maintained. Therefore, destabilization accompanied by concentration due to drying is unlikely to occur and occurrence of cracks is suppressed. Further, when the content of the sulfo group or the like in the resin is 2.0 mmol or less, the amount of a hydrophilic sulfo group or the like present in the resin does not become excessive and the water resistance and abrasion resistance can be satisfactorily maintained.

Further, the content ratio of the first constitutional unit containing at least one of a sulfo group or a salt of a sulfo group in the water-insoluble resin is preferably in a range of from 5% by mass to 25% by mass, more preferably in a range of from 8% by mass to 25% by mass, and particularly preferably in a range of from 10% by mass to 25% by mass with respect to the total mass of the resin. When the content ratio of the first constitutional unit is 5% by mass or greater, the gloss is further improved and the surface of the particles becomes suitable for hydrophilization. Therefore, occurrence of cracks is suppressed. Further, when the content ratio of the first constitutional unit is 25% by mass or less, the hydrophilicity and the hydrophobicity of the particles are well-balanced, the particles are unlikely to be swollen, and the water resistance and abrasion resistance become excellent.

[Constitutional Unit Derived from Monomer Containing Phosphonic Acid Group or Salt of Phosphonic Acid Group]

In a case where a constitutional unit derived from the first monomer contains at least one of a phosphonic acid group or a salt of a phosphonic acid group, the constitutional unit derived from the first monomer is a constitutional unit present in a resin by means of polymerizing (in some cases, copolymerizing the first monomer with at least the second monomer described below) the first monomer containing at least one group selected from a phosphonic acid group or a salt of a phosphonic acid group. The effect of improving the glossiness through overcoating becomes excellent when the first monomer is copolymerized to contain a phosphonic acid group or a salt of a phosphonic acid group.

The first monomer containing at least one group selected from a phosphonic acid group or a salt of a phosphonic acid group is not particularly limited as long as the monomer contains a phosphonic acid group or a salt of a phosphonic acid group or a phosphonic acid group and a salt of a phosphonic acid group. The constitutional unit derived from the first monomer may be appropriately selected from the group consisting of a constitutional unit derived from a monomer containing a phosphonic acid group or a salt of a phosphonic acid group and a constitutional unit derived from a monomer containing a phosphonic acid group and a salt of a phosphonic acid group. The first monomer may be used alone or in combination of two or more kinds thereof.

Among the constitutional units, a constitutional unit represented by Formula 2 is preferable as the constitutional unit derived from the first monomer containing at least one group selected from a phosphonic acid group and a salt of a phosphonic acid group.

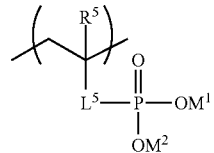

Formula 2

In Formula 2, $R^5$ represents a methyl group or a hydrogen atom and $L^5$ represents a single bond or a group selected from the following group a. The group a has the same definition as the group a in Formula 1.

$M^1$ and $M^2$ each independently represent a hydrogen atom or a cation.

Examples of the cation as $M^1$ and $M^2$ include alkali metal ions such as a sodium ($Na^+$) ion, a potassium (10 ion, and a lithium ($Li^+$) ion; alkaline earth metal ions such as a calcium ($Ca^{2+}$) ion and a magnesium ($Mg^{2+}$) ion; and ions such as an ammonium ($NH^{4+}$) ion and a monoethanolammonium ion ($HO(CH_2)_2NH^{4+}$).

In addition, as a method of introducing at least one group selected from a phosphonic acid group and a salt of a phosphonic acid group into a water-insoluble resin, a monomer having at least one group selected from a phosphonic acid group and a salt of a phosphonic acid group may be copolymerized. Further, a monomer containing a phosphonic acid group is copolymerized and water-insoluble resin particles are synthesized and neutralized using a base to obtain a salt of a phosphonic acid group in a case where a salt of a phosphonic acid group is introduced into the water-insoluble resin particles.

Examples of the constitutional unit derived from a monomer having at least one group selected from a phosphonic acid group and a salt of a phosphonic acid group include 2-methacryloyloxyethyl acid phosphate (for example, Light Ester P-1M manufactured by KYOEISHA CHEMICAL Co., Ltd. or Phosmer M manufactured by Uni-chemical Co., Ltd.), bis(2-methacryloyloxyethyl) acid phosphate (for example, Light Ester P-2M manufactured by KYOEISHA CHEMICAL Co., Ltd.), acid phosphooxypolyoxyethylene glycol monomethacrylate (for example, Phosmer PE manufactured by Uni-chemical Co., Ltd.), 3-chloro-2-acid phosphooxypropyl methacrylate (for example, Phosmer CL manufactured by Uni-chemical Co., Ltd.), acid phosphooxypolyoxypropylene glycol monomethacrylate (for example, Phosmer PP manufactured by Uni-chemical Co., Ltd.), vinylphosphonic acid, and salts of these. However, the embodiment of the present invention is not limited to these specific examples. Further, as the counter ions of the salts, a Na ion, a K ion, a Li ion, and an Al ion are preferable.

Further, 2-methacryloyloxyethyl acid phosphate is more preferable and dimethylaminoethyl methacrylate half salt (Phosmer MR) of 2-methacryloyloxyethyl acid phosphate is also preferably used.

The content of at least one group selected from a phosphonic acid group and a salt of a phosphonic acid group in the water-insoluble resin contained in particles is preferably in a range of from 0.05 mmol to 2.0 mmol, more preferably in a range of from 0.10 mmol to 1.8 mmol, and still more preferably in a range of from 0.5 mmol to 1.7 mmol per 1 g of the resin. When the content of the phosphonic acid group or the like in the resin is 0.05 mmol or greater, the gloss is further improved and the presence of the phosphonic acid group and the salt of the phosphonic acid group, which are stabilized groups, is maintained. Therefore, destabilization accompanied by concentration due to drying is unlikely to occur and occurrence of cracks is suppressed. Further, when the content of the phosphonic acid group or the like in the resin is 2.0 mmol or less, the amount of a hydrophilic phosphonic acid group or the like present in the resin does not become excessive and the water resistance and abrasion resistance can be satisfactorily maintained.

Further, the content ratio of the first constitutional unit containing at least one group selected from a phosphonic acid group and a salt of a phosphonic acid group in the water-insoluble resin is preferably in a range of from 5% by mass to 25% by mass, more preferably in a range of from 8% by mass to 25% by mass, and particularly preferably in a range of from 10% by mass to 25% by mass with respect to the total mass of the resin. When the content ratio of the first constitutional unit is 5% by mass or greater, the gloss is further improved and the surface of the particles becomes suitable for hydrophilization. Therefore, occurrence of cracks is suppressed. Further, when the content ratio of the first constitutional unit is 25% by mass or less, the hydrophilicity and the hydrophobicity of the particles are well-balanced, the particles are unlikely to be swollen, and the water resistance and abrasion resistance become excellent.

[Constitutional Unit Derived from Monomer Containing Phosphoric Acid Group or Salt of Phosphoric Acid Group]

In a case where a constitutional unit derived from the first monomer contains at least one of a phosphoric acid group or a salt of a phosphoric acid group, the constitutional unit derived from the first monomer is a constitutional unit present in a resin by means of polymerizing (in some cases, copolymerizing the first monomer with at least the second monomer described below) the first monomer containing at least one group selected from a phosphoric acid group or a salt of a phosphoric acid group. The effect of improving the glossiness through overcoating becomes excellent when the first monomer is copolymerized to contain a phosphoric acid group or a salt of a phosphoric acid group.

The first monomer containing at least one group selected from a phosphoric acid group or a salt of a phosphoric acid group is not particularly limited as long as the monomer contains a phosphoric acid group or a salt of a phosphoric acid group or a phosphoric acid group and a salt of a phosphoric acid group. The constitutional unit derived from the first monomer may be appropriately selected from the group consisting of a constitutional unit derived from a monomer containing a phosphoric acid group or a salt of a phosphoric acid group and a constitutional unit derived from a monomer containing a phosphoric acid group and a salt of a phosphoric acid group. The first monomer may be used alone or in combination of two or more kinds thereof.

Among the constitutional units, a constitutional unit represented by Formula 3 is preferable as the constitutional unit derived from the first monomer containing at least one group selected from a phosphoric acid group and a salt of a phosphoric acid group.

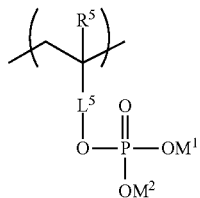

Formula 3

In Formula 3, $R^5$ represents a methyl group or a hydrogen atom and $L^5$ represents a single bond or a group selected from the following group a. The group a has the same definition as the group a in Formula 1.

$M^1$ and $M^2$ each independently represent a hydrogen atom or a cation.

Examples of the cation as $M^1$ and $M^2$ include alkali metal ions such as a sodium ($Na^+$) ion, a potassium ($K^+$) ion, and a lithium ($Li^+$) ion; alkaline earth metal ions such as a calcium ($Ca^{2+}$) ion and a magnesium ($Mg^{2+}$) ion; and ions such as an ammonium ($NH^{4+}$) ion and a monoethanolammonium ion ($HO(CH_2)_2NH^{4+}$).

Examples of the monomer forming the constitutional unit represented by Formula 3 include 2-hydroxyethyl methacrylate phosphoric acid ester.

In addition, as a method of introducing at least one group selected from a phosphoric acid group and a salt of a phosphoric acid group into a water-insoluble resin, a monomer having at least one group selected from a phosphoric acid group and a salt of a phosphoric acid group may be copolymerized. Further, a monomer containing a phosphoric acid group is copolymerized and water-insoluble resin particles are synthesized and neutralized using a base to obtain a salt of a phosphoric acid group in a case where a salt of a phosphoric acid group is introduced into the water-insoluble resin particles.

The content of at least one group selected from a phosphoric acid group and a salt of a phosphoric acid group in the water-insoluble resin contained in particles is preferably in a range of from 0.05 mmol to 2.0 mmol, more preferably in a range of from 0.10 mmol to 1.8 mmol, and still more preferably in a range of from 0.5 mmol to 1.7 mmol per 1 g of the resin. When the content of the phosphoric acid group or the like in the resin is 0.05 mmol or greater, the gloss is further improved and the presence of the phosphoric acid group and the salt of the phosphoric acid group, which are stabilized groups, is maintained. Therefore, destabilization accompanied by concentration due to drying is unlikely to occur and occurrence of cracks is suppressed. Further, when the content of the phosphoric acid group or the like in the resin is 2.0 mmol or less, the amount of a hydrophilic phosphoric acid group or the like present in the resin does not become excessive and the water resistance and abrasion resistance can be satisfactorily maintained.

Further, the content ratio of the first constitutional unit containing at least one group selected from a phosphoric acid group and a salt of a phosphoric acid group in the water-insoluble resin is preferably in a range of from 5% by mass to 25% by mass, more preferably in a range of from 8% by mass to 25% by mass, and particularly preferably in a range of from 10% by mass to 25% by mass with respect to the total mass of the resin. When the content ratio of the first constitutional unit is 5% by mass or greater, the gloss is further improved and the surface of the particles becomes suitable for hydrophilization. Therefore, occurrence of cracks is suppressed. Further, when the content ratio of the first constitutional unit is 25% by mass or less, the hydrophilicity and the hydrophobicity of the particles are well-balanced, the particles are unlikely to be swollen, and the water resistance and abrasion resistance become excellent.

Among the examples described above, from the viewpoints of improving dispersion stability of particles in a liquid and further improving the gloss, a sulfo group or a salt of a sulfo group is preferable as the acidic group (specific acidic group or the like) contained in the resin. When the resin contains a sulfo group or a salt of a sulfo group, particles are uniformly dried without destabilization in a state of being concentrated during drying. Accordingly, the effect of improving the gloss is increased.

For example, when a phosphonic acid group or a salt of a phosphonic acid group enters a state of being concentrated during drying, the phosphonic acid group or the salt of the phosphonic acid group tends to be destabilized and particles are softly aggregated so that cracks easily occur during drying. As the result, the effect of improving the gloss is decreased.

In the overcoat liquid according to the embodiment of the present invention, a total content A of a sulfo group, a salt of a sulfo group, a phosphonic acid group, a salt of a phosphonic acid group, a phosphoric acid group, and a salt of a phosphoric acid group in the water-insoluble resin contained in the water-insoluble resin particles on a molar basis is preferably in a range of from 0.05 mmol to 2.0 mmol, more preferably in a range of from 0.10 mmol to 1.8 mmol, and still more preferably in a range of from 0.5 mmol to 1.7 mmol per 1 g of the particles of the water-insoluble resin.

When the content A is 0.05 mmol or greater, the gloss is further improved and the presence of "the acidic group", which is a stabilized group, is maintained. Therefore, destabilization accompanied by concentration due to drying is unlikely to occur and occurrence of cracks is suppressed. Further, when the content A is 2.0 mmol or less, the amount of a hydrophilic sulfo group or the like present in the resin does not become excessive and the water resistance and abrasion resistance can be satisfactorily maintained.

The content A of a sulfo group, a salt of a sulfo group, a phosphonic acid group, a salt of a phosphonic acid group, a phosphoric acid group, and a salt of a phosphoric acid group (specific acidic group or the like) in the water-insoluble resin on a molar basis is acquired using the following method.

The overcoat liquid is centrifuged using a test tube (Amicon Ultra-15, cutoff molecular weight of 100 kDa, manufactured by Merck KGaA) on which an ultrafiltration filter is mounted, particles of the water-insoluble resin are recovered and completely dissolved in a solvent, and the structure is identified by nuclear magnetic resonance spectroscopy (NMR). In this manner, the content ratio between constitutional units derived from each monomer and the structure and the content A of the acidic group (specific acidic group or the like) contained in the resin are calculated.

——Second Constitutional Unit——

It is preferable that the water-insoluble resin has the second constitutional unit derived from a monomer containing an aromatic ring structure in addition to the first constitutional unit.

The second constitutional unit is a constitutional unit present in the resin by means of copolymerizing the second monomer containing an aromatic ring structure with at least the first monomer. The hydrophobization of particles of the water-insoluble resin can be more increased by copolymerizing the second monomer so that the aromatic ring structure is included in a molecule and the heat stability of the particles can be satisfactorily maintained by increasing the glass transition temperature, compared to a case where an aliphatic structure such as an alkyl chain is included in a molecule. Moreover, when the second monomer has the aromatic ring structure, the refractive index of the resin is increased and thus a film with excellent gloss characteristics can be formed.

In addition, the constitutional unit derived from the second monomer is a hydrophobic constitutional unit and does not contain the above-described specific acidic group or the like. Accordingly, the constitutional unit derived from the second monomer is distinguished from the constitutional unit derived from the first monomer containing the above-described specific acidic group or the like in terms that the constitutional unit derived from the second monomer does not contain the specific acidic group or the like.

The second monomer having an aromatic ring structure is not particularly limited as long as the monomer has the aromatic ring structure. The constitutional unit derived from the second monomer may be appropriately selected from constitutional units derived from monomers having the aromatic ring structure. The second monomer may be used alone or in combination of two or more kinds thereof.

Among the constitutional units, a constitutional unit selected from the group consisting of constitutional units represented by Formula A or Formula B is preferable as the constitutional unit derived from the second monomer.

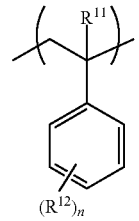

Formula A

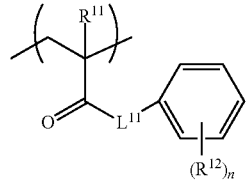

Formula B

In Formulae A and B, represents a methyl group or a hydrogen atom.

$R^{12}$ represents a hydrogen atom or a chain-like or branched alkyl group having 1 to 10 carbon atoms. Examples of the chain-like or branched alkyl group having 1 to 10 carbon atoms include a methyl group, an ethyl group, an n-propyl group, an i-propyl group, and a t-butyl group. $R^{12}$ represents preferably a hydrogen atom or a chain-like or branched alkyl group having 4 to 10 carbon atoms and more preferably a hydrogen atom or a methyl group. Further, $R^{12}$ may represent an unsubstituted group or a group substituted with a substituent. In a case where $R^{12}$ represents a group substituted with a substituent, a halogen (such as a chlorine atom or a bromine atom) or an alkyl group (such as a methyl group or an ethyl group) may be exemplified as the substituent.

In Formulae A and B, n represents an integer of 0 to 5. In a case where n represents 2 or greater, a plurality of $R^{12}$'s may be the same as or different from each other.

$L^{11}$ represents a single bond, a chain-like, branched, or cyclic alkylene group having 1 to 18 carbon atoms, an arylene group having 6 to 18 carbon atoms, or a divalent linking group formed by one or two or more selected from the group consisting of —O—, —NH—, —S—, and —C(=O)— being linked to each other.

Examples of the chain-like, branched, or cyclic alkylene group having 1 to 18 carbon atoms include a methylene group, an ethylene group, an i-propylene group, a t-butylene group, and an n-propylene group.

Examples of the arylene group having 6 to 18 carbon atoms include a phenylene group, a naphthalene group, and a tolylene group.

Among the groups, it is preferable that $L^H$ represents a divalent linking group shown below. In the following divalent linking groups, $R^{21}$'s each independently represent a methyl group or a hydrogen atom. n represents an integer of 1 to 8.

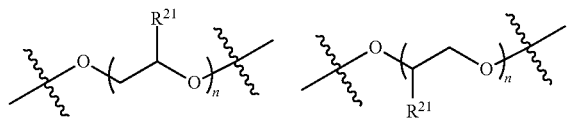

Hereinafter, specific examples of the constitutional units derived from the second monomer having an aromatic ring structure will be described. However, the embodiment of the present invention is not limited to these specific examples.

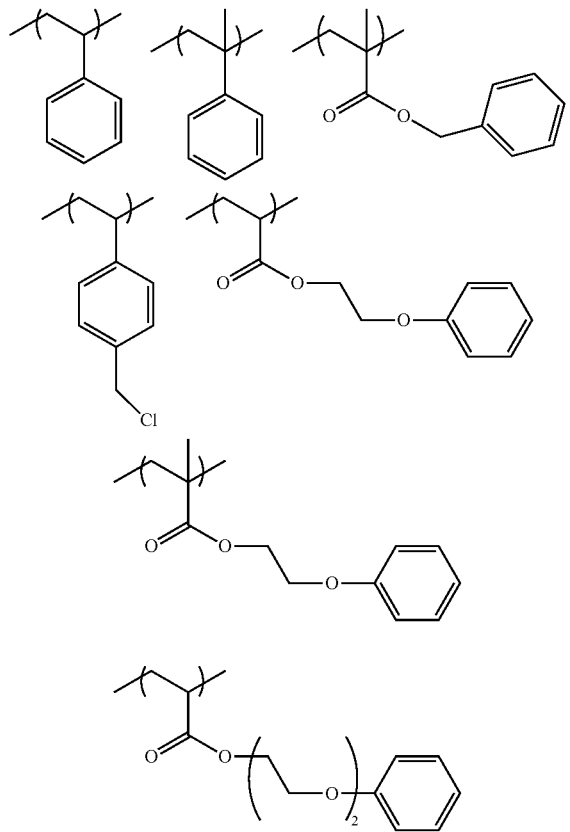

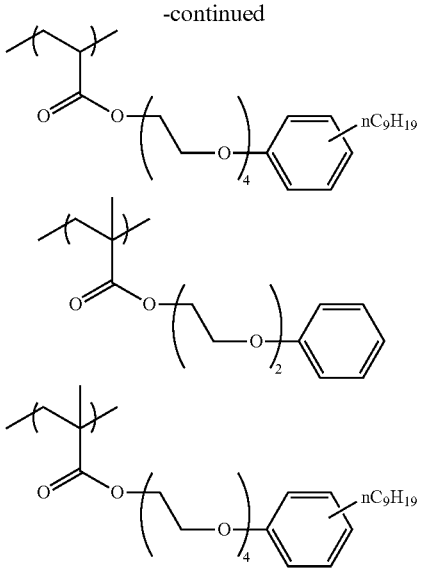

Among examples, a constitutional unit represented by Formula A is preferable as the second constitutional unit. Among the examples, a constitutional unit derived from styrene is particularly preferable. When the water-insoluble resin contains the constitutional unit represented by Formula A, the proportion of oxygen atoms in a molecule of the water-insoluble resin is decreased and the effect of suppressing a decrease in density of a solid image is increased. Further, since styrene is a compound which is more hydrophobic than a monomer containing elements other than carbon atoms and hydrogen atoms, the water-resistance and the abrasion resistance become excellent by preventing particles from being swollen and the dispersion stability of particles is further improved.

The content ratio of the second constitutional unit (preferably a constitutional unit represented by Formula A or B) having an aromatic ring structure in the water-insoluble resin can be set to be in a range of from 5% to 80% by mass and is preferably in a range of from 10% to 40% by mass and more preferably in a range of from 20% to 40% by mass with respect to the total mass of the water-insoluble resin.

Particularly, in a case where the total content ratio of the constitutional units represented by Formula A or B is 10% by mass or greater, the particles of the water-insoluble resin are suitable for hydrophobization, the swelling of the particles in a case of being present in an aqueous overcoat liquid is easily prevented, and the dispersion stability of the particles in a case of being dispersed and contained in the overcoat liquid is further improved. As the result, a decrease in gloss accompanied by the occurrence of unevenness in the form of a trip on the overcoated surface can be effectively suppressed. Further, it is advantageous that the content ratio of the constitutional unit represented by Formula A or B is 40% by mass or less in terms of the density of a solid image and prevention of occurrence of unevenness in the form of a strip.

———Constitutional Units Derived from Other Monomers———

The water-insoluble resin of the water-insoluble resin particles may contain constitutional units derived from monomers other than the above-described constitutional units. Examples of the constitutional units derived from other monomers include constitutional units derived from acrylic acid ester monomers (for example, methacrylic acid alkyl ester containing an alkyl moiety having 1 to 8 carbon atoms (preferably 1 to 4 carbon atoms), such as methyl methacrylate, ethyl methacrylate, 2-hydroxyethyl methacrylate, or 2-ethylhexyl methacrylate; and acrylic acid alkyl ester containing an alkyl moiety having 1 to 8 carbon atoms (preferably 1 to 4 carbon atoms), such as methyl acrylate, ethyl acrylate, 2-hydroxyethyl acrylate, or 2-ethylhexyl acrylate), amide monomers (such as acrylamide, N-(2-hydroxyethyl)acrylamide, N,N-dimethylacrylamide, N,N-diethylacrylamide, isopropylacrylamide, N-(2-hydroxymethyl)acrylamide, and methacrylamide), vinyl cyanide monomers (such as acrylonitrile and methacrylonitrile), ethylenically unsaturated carboxylic acid hydroxyalkyl ester monomers (such as β-hydroxyethyl acrylate and β-hydroxyethyl methacrylate), tertiary salts such as hydrochloride and sulfate of dialkylaminoalkyl (meth)acrylate (such as dimethylaminoethyl (meth)acrylate, diethylaminoethyl (meth)acrylate, dimethylaminoethyl (meth)acrylate, diethylamino-2-hydroxypropyl (meth)acrylate, and dimethylaminopropyl (meth)acrylate), a tertiary salt of hydrochloride and sulfate of dialkylaminoalkyl (meth)acrylamide (such as dimethylaminoethyl (meth)acrylamide), cationic monomers (quaternary salts, for example, a halogenated alkyl adduct (such as a methyl chloride adduct) of dialkylaminoalkyl (meth)acrylate and a halogenated aryl adduct (such as a benzyl chloride adduct), and quaternary salts, for example, a halogenated alkyl adduct (such as a methyl chloride adduct) of dialkylaminoalkyl (meth)acrylate and a halogenated aryl adduct (such as a benzyl chloride adduct)), and bifunctional (meth) acrylate (such as ethylene glycol dimethacrylate, ethylene glycol methacrylate, diethylene glycol dimethacrylate, or diethylene glycol methacrylate).

However, the examples of the constitutional units derived from other monomers are not limited to the constitutional units described above.

Constitutional units derived from a carboxy group and other monomers described below may be exemplified.

It is preferable that the water-insoluble resin of the water-insoluble resin particles does not contain a carboxy group. Specifically, it is preferable that the water-insoluble resin thereof does not contain a constitutional unit derived from a monomer containing a carboxy group as a copolymer component. In a case where the water-insoluble resin that forms particles contributes to dispersion of particles by means of containing a carboxy group, protons of an acid in the pre-treatment liquid are exchanged with the carboxy group and aggregate and thus this results in a decrease of gloss.

The expression "does not contain a carboxy group" indicates that the amount of the carboxy group contained in a molecule of the water-insoluble resin is 0.20 mmol or less. The expression "the amount of the carboxy group is 0.20 mmol or less" means that the molecule does not substantially contain a carboxy group, and the content of the carboxy group is preferably 0.10 mmol or less.

The water-insoluble resin may contain only one constitutional unit or a combination of two or more constitutional units derived from other monomers.

The content of the constitutional units derived from other monomers can be set to 5% by mass or greater and less than 50% by mass and is more preferably in a range of from 10% to 30% by mass and still more preferably in a range of from 30% to 20% by mass with respect to the total mass of the water-insoluble resin.

From the viewpoint of maintaining the hydrophilicity of water-insoluble resin particles, constitutional units derived from a (meth)acrylic acid ester compound are preferable as the constitutional units derived from other monomers. Among these, constitutional units derived from monomers selected from methyl methacrylate, ethyl methacrylate, ethyl acrylate, and 2-ethylhexyl acrylate are more preferable.

Further, the constitutional units derived from other monomers are distinguished from the first constitutional unit containing the specific acid group or the like and the second constitutional unit containing an aromatic ring structure in terms that the constitutional units derived from other monomers do not contain the specific acid group or the like and the aromatic ring structure.

Hereinafter, specific examples of the water-insoluble resin will be described. However, the embodiment of the present invention is not limited to the following specific examples. Further, the subscript for each constitutional unit shows the compositional ratio on a mass basis (% by mass).

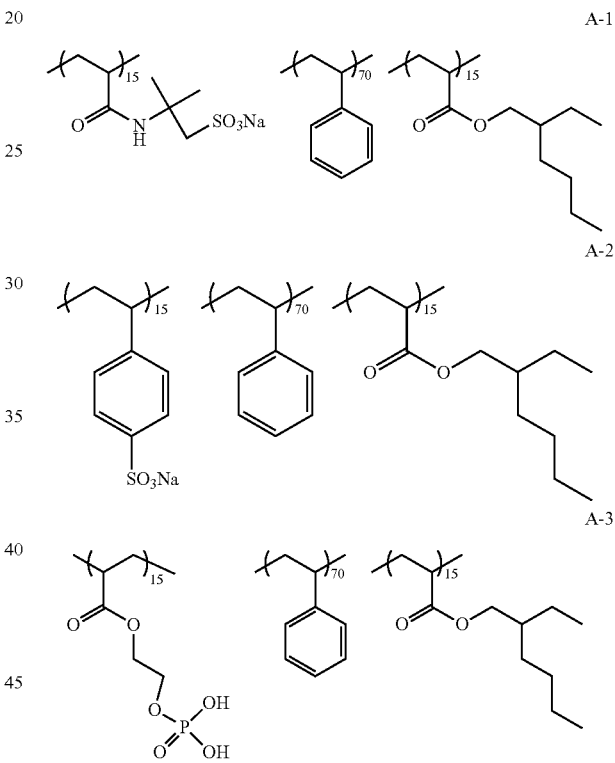

Further, in a case where the constitutional units derived from other monomers are introduced into the water-insoluble resin, the constitutional units derived from other monomers can be introduced into the water-insoluble resin by copolymerizing other monomers.

In a case where constitutional units derived from monomers containing at least one selected from a carboxy group and a salt of the carboxy group, as other monomers, are introduced into the water-insoluble resin, a method of regenerate a carboxy group by copolymerizing other monomers to synthesize a copolymer, hydrolyzing the synthesized copolymer, and adding a strong acid thereto may be employed.

The glass transition temperature (Tg) of the water-insoluble resin is preferably 60° C. or higher. When the Tg is 60° C. or higher, the heat resistance of a formed resin film becomes excellent. From the viewpoints of satisfactorily maintaining the heat resistance of a resin film which is dispersed and formed in an overcoat liquid and satisfactorily forming a film, the Tg is preferably in a range of from 60° C. to 150° C., more preferably in a range of from 70° C. to 130° C., and particularly preferably in a range of from 80° C. to 110° C.

The Tg of the water-insoluble resin particles is a value obtained by performing measurement using a differential scanning calorimeter (DSC) EXSTAR6220 (manufactured by SII Nanotechnology, Inc.).

The weight-average molecular weight of the water-insoluble resin particle diameter is preferably in a range of from 1000 to 1000000, more preferably in a range of from 5000 to 500000, still more preferably in a range of from 10000 to 300000, and particularly preferably in a range of from 20000 to 70000 from the viewpoint of the viscosity of the overcoat liquid.

The weight-average molecular weight can be measured by gel permeation chromatography (GPC).

Specifically, according to GPC, HLC (registered trademark)-8220GPC (manufactured by TOSOH CORPORATION) is used as a measurement apparatus, three columns of TSKgel, Super Multipore HZ-H (manufactured by TOSOH CORPORATION, 4.6 mmID×15 cm) are used as columns, and tetrahydrofuran (THF) is used as an eluant. The weight-average molecular weight is measured under conditions of a sample concentration of 0.45% by mass, a flow rate of 0.35 mL/min, a sample injection amount of 10 μl, and a measurement temperature of 40° C. using a refractive index (RI) detector. Further, the calibration curve is created from 8 samples of "standard samples TSK standard, polystyrene" (manufactured by TOSOH CORPORATION), which are "F-40", "F-20", "F-4", "F-1", "A-5000", "A-2500", "A-1000", and "n-propylbenzene".

~Surfactant in Particles~

It is preferable that the resin particles include a surfactant (hereinafter, also referred to as a specific surfactant) containing an acidic group (specific acidic group or the like) selected from the group consisting of a sulfo group, a salt of a sulfo group, a phosphonic acid group, a salt of a phosphonic acid group, a phosphoric acid group, and a salt of a phosphoric acid group in at least a part of the surface of the particles. In this case, the particles include at least a particulate resin and a specific surfactant.

The concept of "the resin includes a specific surfactant" includes a mode in which the surface of the resin is coated with a surfactant and a mode in which the resin includes a surfactant.

The specific surfactant contained in the particles and the surfactant introduced into a liquid are distinguished from each other by differentiating a case where the particles and the specific surfactant are extracted from different phases from a case where the particles and the specific surfactant are extracted from the same phase at the same time, when the particles are extracted from the overcoat liquid through centrifugation as described below.

In the resin particles, the surface tension of the particles can be effectively decreased by employing a structure in which at least a part of the surface of the particles includes the specific surfactant in addition that the resin forming particles contains the specific acidic group or the like. In this manner, the coating uniformity in a case where the overcoat layer is formed through coating is improved and the effect of imparting the glossiness through overcoating is further improved.

Among the examples of the acidic group (specific acidic group or the like) contained in the surfactant, a sulfo group or a salt of a sulfo group is preferable in terms that the effect of improving the coating uniformity in a case where the overcoat layer is formed through coating is more significantly shown.

The total content B of the acidic group (specific acidic group or the like) selected from the group consisting of a sulfo group, a salt of a sulfo group, a phosphonic acid group, a salt of a phosphonic acid group, a phosphoric acid group, and a salt of a phosphoric acid group, which is derived from the specific surfactant contained in the particles is preferably in a range of from 0.02 mmol to 0.30 mmol per 1 g of the particles.

When the content B is 0.02 mmol or greater, the coating uniformity in a case where the overcoat layer is formed through coating is improved and the effect of imparting the glossiness through overcoating is further improved. Further, when the content B is 0.30 mmol or less, the amount of a hydrophilic sulfo group or the like present in the resin does not become excessive and the water resistance and abrasion resistance can be satisfactorily maintained.

The total content B of a sulfo group, a salt of a sulfo group, a phosphonic acid group, a salt of a phosphonic acid group, a phosphoric acid group, and a salt of a phosphoric acid group (specific acidic group or the like) on a molar basis, which are derived from the specific surfactant contained in the particles, is acquired according to the same method as the method used to acquire the total content A of the specific acidic group or the like in the water-insoluble resin on a molar basis.

The overcoat liquid is centrifuged using a test tube (Amicon Ultra-15, cutoff molecular weight of 100 kDa, manufactured by Merck KGaA) on which an ultrafiltration filter is mounted, particles of the water-insoluble resin are recovered and completely dissolved in a solvent, and the structure is identified by nuclear magnetic resonance spectroscopy (NMR).

In this manner, in regard to the particles containing the specific surfactant on the surface of the resin particles, the structure and the content ratio of the surfactant and the content B of the specific acidic group or the like derived from the surfactant contained in the particles are calculated.

In the resin particles according to the embodiment of the present invention, the presence of the specific acidic group or the like contained in the particles mainly contributes to the improvement of the glossiness through overcoating and the presence of the specific acidic group or the like derived from the surfactant contained in the particles mainly contributes to the improvement of the coating uniformity in a case where the overcoat layer is formed through coating.

It is preferable that the water-insoluble resin and the surfactant in the particles are in the following relationship related to the specific acidic group or the like.

The ratio (B/A) of the total content A [mmol] of a sulfo group, a salt of a sulfo group, a phosphonic acid group, a salt of a phosphonic acid group, a phosphoric acid group, and a salt of a phosphoric acid group in the water-insoluble resin contained in the particles per 1 g of the water-insoluble resin on a molar basis to the total content B [mmol] of a sulfo group, a salt of a sulfo group, a phosphonic acid group, a salt of a phosphonic acid group, a phosphoric acid group, and a salt of a phosphoric acid group which are derived from the surfactant contained in the particles per 1 g of the water-insoluble resin on a molar basis is preferably in a range of from 0.1 to 0.8.

When the ratio B/A is 0.1 or greater, in the particles, the presence of the specific acidic group or the like of the surfactant contributes to the dispersion stability in the presence of the specific acidic group or the like in the water-insoluble resin and thus the coating uniformity in a case where the overcoat layer is formed through coating is further improved. In addition, when the ratio B/A is 0.8 or less, since the amount of the specific acidic group or the like in the water-insoluble resin does not become relatively and excessively small, the destabilization accompanied by concentration due to drying is unlikely to occur and occurrence of a spot-like pattern or cracks is suppressed.

From the same viewpoint as described above, the ratio B/A is more preferably in a range of from 0.15 to 0.45 and still more preferably in a range of from 0.15 to 0.3.

The ratio B/A is acquired by respectively acquiring the content A and the content B using the above-described method and calculating the ratio of the content B to the content A.

The specific surfactant containing the specific acidic group or the like is not particularly limited as long as the specific surfactant contains the specific acidic group or the like and can be selected from known surfactants.

Examples of the known surfactants include surfactants represented by Formula (1) or (2).

$$R_1\text{-}L_1\text{-}A \quad \text{Formula (1)}$$

In Formula (1), $R_1$ represents a branched or linear alkyl group having 6 or more carbon atoms, an unsubstituted naphthyl group, an unsubstituted phenyl group, a naphthyl group obtained by substituting at least one branched or linear alkyl group, or a phenyl group obtained by substituting at least one branched or linear alkyl group.

As the branched or linear alkyl group having 6 or more carbon atoms, a branched or linear alkyl group having 6 to 20 carbon atoms is preferable and a branched or linear alkyl group having 12 to 20 carbon atoms is more preferable, and examples thereof include an n-hexyl group and an n-dodecyl group.

As the branched or linear alkyl group to be substituted with a naphthyl group or a phenyl group, an alkyl group having 1 to 20 carbon atoms is exemplified. Further, as the branched or linear alkyl group, an alkyl group having 6 to 20 carbon atoms is preferable and an alkyl group having 12 to 20 carbon atoms is more preferable, and examples thereof include a methyl group, an ethyl group, a propyl group, an isopropyl group, an n-hexyl group, an n-dodecyl group, and a branched dodecyl group.

In Formula (1), $L_1$ represents at least one selected from the group of linking groups consisting of a single bond, an ester bond, an ether bond, an amide bond, a N-alkylamide bond, and the following group b. As the alkyl group of the N-alkylamide bond, an alkyl group having 1 to 20 carbon atoms is exemplified. Further, as the alkyl group of the N-alkylamide bond, an alkyl group having 6 to 20 carbon atoms is preferable and an alkyl group having 12 to 20 carbon atoms is more preferable, and examples thereof include a methyl group, an ethyl group, a propyl group, and an isopropyl group.

In Formula (1), A represents $SO_3M$ or $OSO_3M$. M represents a sodium ion or a potassium ion.

[Group b]

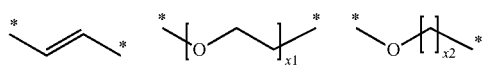

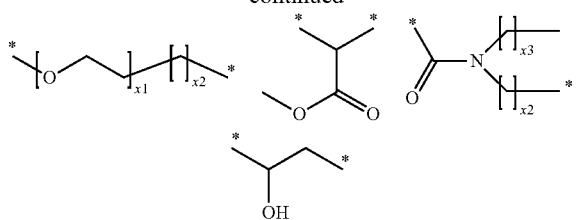

In the group b, x1 and x2 each independently represent an integer of 1 to 30 and x3 represents an integer of 0 to 30. The symbol "*" represents a linking portion.

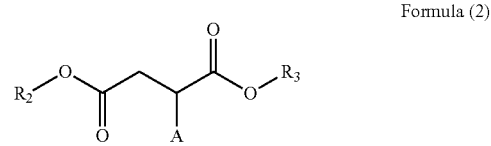

Formula (2)

In Formula (2), $R_2$ and $R_3$ each independently represent a branched or linear alkyl group having 3 or more carbon atoms, an unsubstituted naphthyl group, an unsubstituted phenyl group, a naphthyl group obtained by substituting at least one branched or linear alkyl group, or a phenyl group obtained by substituting at least one branched or linear alkyl group.

As the branched or linear alkyl group having 3 or more carbon atoms, a branched or linear alkyl group having 3 to 20 carbon atoms is preferable and a branched or linear alkyl group having 12 to 20 carbon atoms is more preferable, and examples thereof include an n-hexyl group, an n-octyl group, and a branched octyl group.

As the branched or linear alkyl group to be substituted with a naphthyl group or a phenyl group, an alkyl group having 1 to 20 carbon atoms is exemplified. Further, as the branched or linear alkyl group, an alkyl group having 6 to 20 carbon atoms is preferable and an alkyl group having 12 to 20 carbon atoms is more preferable, and examples thereof include a methyl group, an ethyl group, a propyl group, and an isopropyl group.

In Formula (2), A represents $SO_3M$ or $OSO_3M$. M represents a sodium ion or a potassium ion.

Hereinafter, specific examples of the compounds represented by Formula (1) or (2) will be described.

Specific examples thereof include sulfuric acid ester salts, for example, alkyl sulfuric acid ester salts such as sodium n-octyl sulfate, sodium 2-ethylhexyl sulfate, sodium n-decyl sulfate, sodium lauryl sulfate, sodium myristyl sulfate, sodium palmityl sulfate, sodium stearyl sulfate, sodium arachidyl sulfate, sodium behenyl sulfate, sodium dodecyl sulfate, sodium oleyl sulfate, sodium linole sulfate, sodium linolenyl sulfate, sodium isostearyl sulfate, sodium coconut oil alkyl sulfate, sodium palm oil alkyl sulfate, sodium palm kernel oil alkyl sulfate, sodium soybean oil alkyl sulfate, potassium n-octyl sulfate, potassium 2-ethylhexyl sulfate, potassium n-decyl sulfate, potassium lauryl sulfate, potassium myristyl sulfate, potassium palmityl sulfate, potassium stearyl sulfate, potassium arachidyl sulfate, potassium behenyl sulfate, potassium oleyl sulfate, potassium linole sulfate, potassium linolenyl sulfate, potassium isostearyl sulfate, potassium coconut oil alkyl sulfate, potassium palm oil alkyl sulfate, potassium palm kernel oil alkyl sulfate, and potassium soybean oil alkyl sulfate; and polyoxyethylene alkyl ether sulfate such as sodium polyoxyethylene (the average addition mole number of an oxyethylene group (EO) is in a range of from 1 to 5)-n-octyl ether sulfate, sodium polyoxyethylene (the average addition mole number of EO is in a range of from 1 to 5)-2-ethylhexyl ether sulfate, sodium polyoxyethylene (the average addition mole number of EO is in a range of from 1 to 5)-n-decyl ether sulfate, sodium polyoxy ethylene (the average addition mole number of EO is in a range of from 1 to 5) lauryl ether sulfate, sodium polyoxyethylene (the average addition mole number of EO is in a range of from 1 to 5) myristyl ether sulfate, sodium polyoxyethylene (the average addition mole number of EO is in a range of from 1 to 5) palmityl ether sulfate, sodium polyoxyethylene (the average addition mole number of EO is in a range of from 1 to 5) stearyl ether sulfate, sodium polyoxyethylene (the average addition mole number of EO is in a range of from 1 to 5) arachidyl ether sulfate, sodium polyoxyethylene (the average addition mole number of EO is in a range of from 1 to 5) behenyl ether sulfate, sodium polyoxyethylene (the average addition mole number of EO is in a range of from 1 to 5) oleyl ether sulfate, sodium polyoxyethylene (the average addition mole number of EO is in a range of from 1 to 5) linole ether sulfate, sodium polyoxyethylene (the average addition mole number of EO is in a range of from 1 to 5) linoleyl ether sulfate, sodium polyoxyethylene (the average addition mole number of EO is in a range of from 1 to 5) isostearyl ether sulfate, sodium polyoxyethylene (the average addition mole number of EO is in a range of from 1 to 5) coconut oil alkyl ether sulfate, sodium polyoxyethylene (the average addition mole number of EO is in a range of from 1 to 5) palm oil alkyl ether sulfate, sodium polyoxyethylene (the average addition mole number of EO is in a range of from 1 to 5) palm kernel oil alkyl ether sulfate, sodium polyoxyethylene (the average addition mole number of EO is in a range of from 1 to 5) soybean oil alkyl ether sulfate, potassium polyoxyethylene (the average addition mole number of EO is in a range of from 1 to 5)-n-octyl ether sulfate, potassium polyoxyethylene (the average addition mole number of EO is in a range of from 1 to 5)-2-ethylhexyl ether sulfate, potassium polyoxyethylene (the average addition mole number of EO is in a range of from 1 to 5)-n-decyl ether sulfate, potassium polyoxyethylene (the average addition mole number of EO is in a range of from 1 to 5) lauryl ether sulfate, potassium polyoxyethylene (the average addition mole number of EO is in a range of from 1 to 5) myristyl ether sulfate, potassium polyoxyethylene (the average addition mole number of EO is in a range of from 1 to 5) palmityl ether sulfate, potassium polyoxyethylene (the average addition mole number of EO is in a range of from 1 to 5) stearyl ether sulfate, potassium polyoxyethylene (the average addition mole number of EO is in a range of from 1 to 5) arachidyl ether sulfate, potassium polyoxyethylene (the average addition mole number of EO is in a range of from 1 to 5) behenyl ether sulfate, potassium polyoxyethylene (the average addition mole number of EO is in a range of from 1 to 5) oleyl ether sulfate, potassium polyoxyethylene (the average addition mole number of EO is in a range of from 1 to 5) linole ether sulfate, potassium polyoxyethylene (the average addition mole number of EO is in a range of from 1 to 5) linoleyl ether sulfate, potassium polyoxyethylene (the average addition mole number of EO is in a range of from 1 to 5) isostearyl ether sulfate, potassium polyoxyethylene (the average addition mole number of EO is in a range of from 1 to 5) coconut oil alkyl ether sulfate, potassium polyoxyethylene (the average addition mole number of EO is in a range of from 1 to 5) palm oil alkyl ether sulfate, potassium polyoxyethylene (the average addition mole number of EO is in a range of from 1 to 5) palm kernel oil alkyl ether sulfate, and potassium polyoxyethylene (the average addition mole number of EO is in a range of from 1 to 5) soybean oil alkyl ether sulfate.

Further, other examples thereof include sulfonates, for example, alkyl sulfonate such as sodium n-hexylsulfonate, sodium 2-ethylhexyl sulfonate, sodium heptyl sulfonate, sodium n-octyl sulfonate, sodium nonyl sulfonate, sodium decyl sulfonate, sodium undecyl sulfonate, sodium dodecyl sulfonate, sodium linear dodecyl benzene sulfonate, or sodium branched dodecyl benzene sulfonate; alkyl sulfonate having an ethylene oxide chain such as sodium 5,8,11-trioxapentadecane-1-sulfonate, sodium 5,8,11-trioxaheptadecane-1-sulfonate, sodium 13-ethyl-5,8,11-trioxaheptadecane-1-sulonate, or sodium 5,8,11,14-tetraoxatetradecosane-1-sulfoante; aryl sulfonate such as sodium benzene sulfonate, sodium p-toluene sulfonate, or sodium p-styrene sulfonate; and dialkyl sulfosuccinate such as sodium di-1,3-dimethylbutyl sulfosuccinate, sodium di-1-methylpentyl sulfosuccinate, or sodium di-2-ethylhexyl sulfosuccinate. The sodium of these sulfonates may be replaced by potassium.

In addition to the surfactants represented by Formula (1) or (2), the following anionic surfactants may be exemplified.

Examples thereof include alkyl sulfonate such as an alkyl sulfuric acid ester salt in which the sodium of the alkyl sulfuric acid ester salt is ammonium or triethanolamine, polyoxyethylene alkyl ether sulfonate in which the sodium of the polyoxyethylene alkyl ether sulfonate is ammonium or triethanolamine, sulfonate in which the sodium of the sulfonate is lithium, sodium propyl sulfonate, sodium n-butyl sulfonate, sodium pentyl sulfonate, or sodium cyclohexyl sulfonate; and aryl sulfonate such as sodium p-hydroxy benzene sulfonate, sodium isophthalic acid dimethyl-5-sulfonate, sodium 1-naphthyl sulfonate, sodium 4-hydroxy naphthyl sulfonate, sodium 1,5-naphthalene disulfonate, or trisodium 1,3,6-naphthalene trisulfonate.

As the sulfuric acid ester salt and the sulfonate, commercially available products or products produced using known methods can be used. Examples of the commercially available products include products produced by various manufacturers described in "Chemical Products of 15911, 2011 Edition (publishing office: The Chemical Daily Co., Ltd., date of publication: Jan. 25, 2011)" and "Japanese Cosmetic Raw Ingredients 2007 (publishing office: Yakuji Nippo Ltd., edited by Japan Cosmetic Industry Association).

Specific examples of the specific surfactant containing the specific acidic group or the like are as follows.

Specific examples of the specific surfactant containing a phosphonic acid group or a salt of a phosphonic acid group include 1-hydroxy-1,1-diphosphonic acid (HEDP) such as PH-210 SD or PH-214 SD (manufactured by CHELEST CORPORATION).

Specific examples of the specific surfactant containing a phosphoric acid group or a salt of a phosphoric acid group include potassium polyoxyethylene alkyl ether phosphate (such as ELECTROSTRIPPER F manufactured by Kao Corporation), polyoxyethylene alkyl ether phosphoric acid ester (such as PLYSURF A208, A212, or A215 manufactured by DKS Co., Ltd., NEWCOL 1000-FCP, ANTOX EHD-400, OR EHD-PNA manufactured by Nippon Nyukazai Co., Ltd.), and polyoxyethylene styrenated phenyl ether phosphoric acid ester (such as PLYSURF AL manufactured by DKS Co., Ltd.).

As the potassium polyoxyethylene alkyl ether phosphate, a compound represented by Structural Formula (P-1) is preferable.

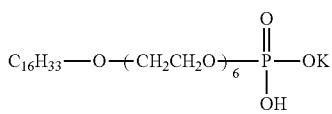

Structural Formula P-1

(Water)

The overcoat liquid is a water-based liquid containing water as a main solvent.

The concept of using water as a main solvent means that the content of water is greater than 50% by mass with respect to the total mass of all solvents contained in the overcoat liquid.

As water, ion exchange water or the like can be used.

The content of water in the overcoat liquid is not particularly limited, but is preferably in a range of from 1% by mass to 80% by mass and more preferably in a range of from 5% by mass to 70% by mass with respect to the total mass of the overcoat liquid.

(Other components)

The overcoat liquid may contain other components such as organic solvents, waxes, and surfactants as necessary.

~Organic Solvent~

Examples of the organic solvent include alcohol (for example, methanol, ethanol, propanol, isopropanol (IPA), butanol, isobutanol, sec-butanol, t-butanol, pentanol, hexanol, cyclohexanol, or benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether (butyl carbitol), propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), an amine (for example, ethanolamine, diethanolamine, triethanolamine, N-methyl diethanolamine, N-ethyl diethanolamine, morpholine, N-ethyl morpholine, ethylene diamine, diethylene triamine, triethylene tetramine, polyethyleneimine, or tetramethyl propylene diamine), and other polar solvents (for example, formamide, N,N-dimethyl formamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Further, the water-soluble organic solvents may be used alone or two or more kinds thereof.

~Surfactant~

Examples of the surfactant include a non-ionic surfactant, a cationic surfactant, an anionic surfactant, and a betaine surfactant. Among these, an anionic surfactant is preferable.

The anionic surfactant can be appropriately selected from among known anionic surfactants and examples thereof include a sulfuric acid ester salt, a sulfonate, a phosphate, a fatty acid salt, and a formalin condensate. Examples of the cation forming a salt include an ammonium ion, a triethanolamine ion, and a metal cation. Among these cations, a monovalent metal cation is more preferable and a sodium ion or a potassium ion is particularly preferable.

From the viewpoints of improving the effects of suppressing a decrease in density of a solid image portion and suppressing streak unevenness, it is more preferable that the anionic surfactant contains at least one selected from a sulfonate or a sulfuric acid ester salt.

Among examples of the anionic surfactant, from the viewpoint of easily exhibiting the effect of improving the wettability of the surface of an image recording material, sodium lauryl sulfate, sodium linear dodecyl benzene sulfonate, sodium branched dodecyl benzene sulfonate, and sodium di-2-ethylhexyl sulfosuccinate are preferable.

In order to satisfactorily eject the ink composition using an inkjet method, it is preferable that the amount of the surfactant to be contained in the ink composition is set such that the surface tension of the overcoat liquid can be adjusted to be in a range of from 25 mN/m to 40 mN/m. Among the examples of the ranges, it is preferable that the content of the surfactant is set such that the surface tension thereof can be adjusted to be in a range of from 27 mN/m to 37 mN/m.

~Wax~

The overcoat liquid of the embodiment of the present invention may contain a wax.

A "wax" indicates a polymer compound having a melting point of 170° C. or lower and "wax particles" indicate particles formed from the wax. From this viewpoint, a wax is distinguished from a "resin" which is a polymer compound that does not have a melting point or has a melting point of higher than 170° C. Further, wax particles are distinguished from "resin particles".

The melting point indicates a temperature of an endothermic peak top in DSC measurement carried out using a differential scanning calorimeter (DSC) (for example, a differential scanning calorimeter (DSC) EXSTAR6220 (manufactured by Hitachi High-Technologies Corporation)).

From the viewpoint of dispersion stability, it is preferable that the overcoat liquid contains a wax in the form of particles. In other words, it is preferable that the overcoat liquid contains a wax in the form of wax particles. In a case where the overcoat liquid contains a wax, a wax may be used in the form of a dispersion (an aqueous dispersion referred to as a so-called latex) formed by particles being dispersed in an aqueous medium.

Examples of the wax include plant-based and animal-based waxes such as carnauba wax, candeli wax, beeswax, rice wax, and lanolin; petroleum waxes such as paraffin wax, microcrystalline wax, polyethylene wax, oxidized polyethylene wax, and petrolatum; mineral waxes such as montan wax and ozokerite; synthetic waxes such as carbon wax, Hoechst wax, polyolefin wax, and stearic acid amide; natural waxes or synthetic waxes such as an α-olefin-maleic anhydride copolymer; and mixtures of these.

It is preferable that a wax is added in the form of a dispersion and, for example, the ink composition may contain a wax as a dispersion such as an emulsion. Water is preferable as a solvent in a case where a wax is added in the form of a dispersion, but the solvent is not limited to this. For example, an organic solvent which has been typically used is appropriately selected and can be used at the time of dispersion. In regard to organic solvents, the description of paragraph 0027 of JP2006-91780A can be referred to.

Waxes can be used alone or in combination of plural kinds thereof.

Commercially available products on the market may be used as the wax. Examples of the commercially available products include NOPCOAT PEM17 (manufactured by San Nopco Ltd.), CHEMIPEARL (registered trademark) W4005 (manufactured by Mitsui Chemicals, Inc.), AQUACER (registered trademark; the same applies to hereinafter) 515, AQUACER 531, AQUACER 593 (all manufactured by BYK Chemie GmbH), and SELOSOL 524 (manufactured by CHUKYO YUSHI CO., LTD.).

Among these, carnauba wax, polyolefin wax, and polyethylene wax are preferable. Among these, from the viewpoint of abrasion resistance of an image, polyethylene wax is particularly preferable.

—Ink Composition—

The ink composition contains a colorant and water. It is preferable that the ink composition contains resin particles and may further contain other components such as an organic solvent or a surfactant as necessary.

—Colorant—

The ink composition contains at least one colorant. The colorant is not particularly limited and may be a pigment or a dye. In addition, from the viewpoint that aggregation properties become excellent when the colorant is brought into contact with the above-described aggregation component, an anionic colorant is preferable and a pigment is more preferable.

Further, the "anionic colorant" indicates a colorant containing an anionic group such as a carboxy group, a sulfo group, or a phosphoric acid group in the structure (in the structure of a dispersing agent in a case where the colorant is coated with a dispersing agent described below).

(Pigment)

The pigment is not particularly limited, can be selected as appropriate depending on the purpose thereof, and may be any of an organic pigment and an inorganic pigment. From the viewpoint of ink colorability, it is preferable that the pigment is a pigment which is almost insoluble or sparingly soluble in water.

Examples of the organic pigment include a polycyclic pigment such as azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment or a quinophthalone pigment, dye lake such as a basic dye type lake or acidic dye type lake, a nitro pigment, a nitroso pigment, aniline black, and a daylight fluorescent pigment.

Examples of the inorganic pigment include titanium oxide, iron oxide, calcium carbonate, barium sulfate, aluminum hydroxide, barium yellow, cadmium red, chrome yellow, and carbon black.

Further, even pigments which are not described in Color Index can be used as long as the pigments can be dispersed in water. Further, pigments which are surface-treated with a surfactant or a polymer dispersing agent and graft carbon can be used.

Among these pigments, particularly, an azo pigment, a phthalocyanine pigment, an anthraquinone pigment, a quinacridone pigment, and a carbon black pigment are preferable and an anionic azo pigment, an anionic phthalocyanine pigment, and an anionic quinacridone pigment are more preferable.

~Dispersing Agent~

In the ink composition, the form in which a pigment is dispersed by a dispersing agent is preferable. Among examples, particularly, the form in which a pigment is dispersed by a polymer dispersing agent, that is, the form in which at least a part of a pigment is coated with a polymer dispersing agent is preferable.

Hereinafter, a pigment of which at least a part is coated with a polymer dispersing agent is referred to as a "resin-coated pigment".

As the dispersing agent, a polymer dispersing agent or a low-molecular-weight surfactant-type dispersing agent may be used. Further, a polymer dispersing agent which is not crosslinked (non-crosslinked polymer dispersing agent) and a polymer dispersing agent (crosslinked polymer dispersing agent) which is crosslinked by a crosslinking agent may be used.

As the non-crosslinked polymer dispersing agent, a water-soluble non-crosslinked polymer dispersing agent or a water-insoluble non-crosslinked polymer dispersing agent may be used.

As the low-molecular-weight surfactant-type dispersing agent, surfactant type dispersing agents described in paragraphs 0016 to 0020 of JP2010-188661A can be used.

Among the examples of the non-crosslinked polymer dispersing agent, a hydrophilic polymer compound can be used as a water-soluble non-crosslinked polymer dispersing agent.

As the water-soluble non-crosslinked polymer dispersing agent, natural hydrophilic polymer compounds described in paragraphs 0021 and 0022 of JP2010-188661A can be used.

Further, a synthetic hydrophilic polymer compound can be used as the water-soluble non-crosslinked polymer dispersing agent.

Examples of the synthetic hydrophilic polymer compound include polymer compounds having a vinyl-based polymer such as polyvinyl alcohol, polyvinylpyrrolidone, or polyvinyl methyl ether, an acrylic resin such as polyacrylamide, polyacrylic acid or an alkali metal salt thereof, or a water-soluble styrene acrylic resin, a water-soluble styrene maleic acid resin, a water-soluble vinyl naphthalene acrylic resin, a water-soluble vinyl naphthalene maleic acid resin, polyvinylpyrrolidone, polyvinyl alcohol, an alkali metal salt of a β-naphthalenesulfonic acid formalin condensate, and salts of a cationic functional group of quaternary ammonium or an amino group, in the side chain.

Among these, from the viewpoint of dispersion stability and aggregating properties of a pigment, a polymer compound containing a carboxy group is preferable and a polymer compound containing a carboxy group, for example, an acrylic resin such as a water-soluble styrene acrylic resin, a water-soluble styrene maleic acid resin, a water-soluble vinyl naphthalene acrylic resin, or a water-soluble vinyl naphthalene maleic acid resin is particularly preferable.

As the water-insoluble dispersing agent among the examples of the non-crosslinked polymer dispersing agent, a polymer having both of a hydrophobic part and a hydrophilic part can be used. Examples of the water-insoluble dispersing agent include a styrene-(meth)acrylic acid copolymer, a styrene-(met)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

The styrene-(meth)acrylic acid copolymer, the (meth)acrylic acid ester-(meth)acrylic acid copolymer, the polyethylene glycol (meth)acrylate-(meth)acrylic acid copolymer, and the styrene-maleic acid copolymer may be binary copolymers or ternary or higher copolymers.

Among the examples of the non-crosslinked polymer dispersing agent, a (meth)acrylic acid ester-(meth)acrylic acid copolymer is preferable and a benzyl(meth)acrylate-(meth)acrylic acid-methyl(meth)acrylate ternary copolymer is particularly preferable.

Here, the term "(meth)acrylic acid" indicates acrylic acid or methacrylic acid and the term "(meth)acrylate" indicates acrylate or methacrylate.

Further, a copolymer may be a random copolymer, a block copolymer, or a graft copolymer.

The weight-average molecular weight of the non-crosslinked polymer dispersing agent is preferably in a range of from 3000 to 200000, more preferably in a range of from 5000 to 100000, still more preferably in a range of from 5000 to 80000, and particularly preferably in a range of from 10000 to 60000.

In addition, the weight-average molecular weight can be measured according to the same method as the method used for the measuring the weight-average molecular weight of the water-insoluble resin described above.

The acid value of the non-crosslinked polymer dispersing agent is not particularly limited, but it is preferable that the acid value of the non-crosslinked polymer dispersing agent is larger than the acid value of resin particles (preferably self-dispersing resin particles) described below from the viewpoint of the aggregation properties.

A crosslinked polymer dispersing agent is formed by a polymer (uncrosslinked polymer) being crosslinked by a crosslinking agent.

The polymer is not particularly limited and various polymers can be used. Among the various polymers, polyvinyls, polyurethanes, and polyesters which can function as water-soluble dispersing agents are preferable and polyvinyls are more preferable.

It is preferable that the polymer is a copolymer obtained by using a carboxy group-containing monomer as a copolymer component. Examples of the carboxy group-containing monomer include (meth)acrylic acid, β-carboxyethyl acrylate, fumaric acid, itaconic acid, maleic acid, or crotonic acid. Among these monomers, from the viewpoint of crosslinking properties and dispersion stability of the polymer, (meth)acrylic acid and β-carboxyethyl acrylate are preferable.

Since the polymer is crosslinked by a crosslinking agent, the polymer contains a functional group which can be crosslinked by a crosslinking agent. The functional group which can be crosslinked is not particularly limited, and examples thereof include a carboxy group or a salt thereof, an isocyanate group, and an epoxy group. Among these, from the viewpoint of improving dispersibility, a carboxy group or a salt thereof is preferable.

From the viewpoint of water solubility of the polymer, the acid value of the polymer is preferably 90 mgKOH/g or greater and more preferably 95 mgKOH/g or greater.

Further, from the viewpoints of dispersibility and dispersion stability of a pigment, the acid value thereof is preferably in a range of from 100 mgKOH/g to 180 mgKOH/g, more preferably in a range of from 100 mgKOH/g to 170 mgKOH/g, and still more preferably in a range of from 100 mgKOH/g to 160 mgKOH/g.

In addition, the acid value can be measured using a method described in Japanese Industrial Standards (JIS K0070: 1992).

The weight-average molecular weight (Mw) of the polymer is preferably in a range of from 5000 to 120000, more preferably in a range of from 60000 to 120000, still more preferably in a range of from 60000 to 100000, and particularly preferably in a range of from 60000 to 90000.

Further, the weight-average molecular weight can be measured according to the same method used for measuring the weight-average molecular weight of the water-insoluble resin described above.

It is preferable that the polymer contains at least one hydrophobic monomer as a copolymer component. Examples of the hydrophobic monomer include (meth)acrylate containing an aromatic ring group such as alkyl (meth)acrylate having 1 to 20 carbon atoms, benzyl (meth)acrylate, or phenoxyethyl (meth)acrylate, styrene, and derivatives thereof.

The form of copolymerization of a polymer is not particularly limited, and the polymer may be a random polymer, a block polymer, or a graft polymer.

The method of synthesizing a polymer is not particularly limited, but a random polymerization method of a vinyl monomer is preferable from the viewpoint of dispersion stability.

The crosslinking agent is not particularly limited as long as the crosslinking agent is a compound having 2 or more sites that react with a polymer. Among the examples thereof, a compound (bi- or higher functional epoxy group) containing 2 or more epoxy groups is preferable from the viewpoint of excellent reactivity with a carboxy group.

Examples of the crosslinking agent include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylol propane triglycidyl ether. Among these, polyethylene glycol diglycidyl ether, diethylene glycol diglycidyl ether, and trimethylol propane triglycidyl ether are preferable.

As the method of coating a pigment with a crosslinking polymer dispersing agent, a method of preparing a pigment dispersing agent by crosslinking a polymer using a crosslinking agent after a pigment is dispersed using a water-soluble or water-insoluble polymer.

In the ink composition, the mass ratio (pigment:dispersing agent) of the mass of the pigment to the mass of the dispersing agent is preferably in a range of from 1:0.06 to 1:3, more preferably in a range of from 1:0.125 to 1:2, and still more preferably in a range of from 1:0.125 to 1:1.5.

The average particle diameter (the average particle diameter of the resin-coated pigment in the case of the resin-coated pigment, the same applies to hereinafter) of the pigment is preferably in a range of from 10 nm to 200 nm, more preferably in a range of from 10 nm to 150 nm, and still more preferably in a range of from 10 nm to 100 nm. When the average particle diameter is 200 nm or less, color reproducibility becomes excellent and jetting properties when droplets are ejected according to an inkjet method become excellent. Further, when the average particle diameter is 10 nm or greater, light resistance becomes excellent. Further, the particle size distribution is not particularly limited, and any of wide particle size distribution and monodisperse particle size distribution may be used. In addition, two or more pigments having monodisperse particle size distribution may be mixed with each other and then used.

Further, the average particle diameter and the particle size distribution of the pigment are acquired by measuring the volume average particle diameter using a nanotrac particle size distribution measurement apparatus UPA-EX150 (manufactured by Nikkiso Co., Ltd.) according to a dynamic light scattering method.

From the viewpoint of the image density, the content of the pigment in the ink composition is preferably in a range of from 1% by mass to 25% by mass, more preferably in a range of from 2% by mass to 20% by mass, and particularly preferably in a range of from 2% by mass to 10% by mass with respect to the total mass of the ink composition.

The pigment may be used alone or in combination of two or more kinds thereof.

(Dye)

As a dye, a known dye can be used without particular limitation. For example, dyes described in JP2001-115066A, JP2001-335714A, and JP2002-249677A can be preferably used.

Further, in a case of using a dye, a dye which is held by a water-insoluble carrier may be used. The carrier (water-insoluble coloring particle) holding a dye can be used as an aqueous dispersion using a dispersing agent. The carrier is not particularly limited as long as the carrier is insoluble or sparingly soluble in water, and examples thereof include inorganic materials, organic materials, and composite materials of these. Specifically, carriers described in JP2001-181549A and JP2007-169418A can be preferably used.

[Resin Particles]

It is preferable that the ink composition contains at least one kind of resin particles.

The resin particles are different from the above-described polymer dispersing agent (polymer dispersing agent that coats at least a part of the pigment) and are present separately from the pigment.

In a case where the ink composition contains resin particles, it is preferable that the resin particles aggregate when brought into contact with the aggregation component.

Further, from the viewpoint that the aggregating properties when the resin particles are brought into contact with the above-described aggregation component become excellent, resin particles containing an anionic dissociable group other than a sulfo group are preferable as the resin particles. The details of the resin particles containing an anionic dissociable group other than a sulfo group will be described below.

Resin particles containing a sulfo group as an anionic dissociable group are not preferable because the dispersion stability of the resin particles is not greatly improved so that the resin particles do not aggregate when brought into contact with the aggregation component in the pre-treatment liquid.

It is preferable that the resin particles are insoluble or sparingly soluble in water.

The expression "insoluble or sparingly soluble in water" indicates that the dissolution amount of a resin is 15 g or less in a case where the resin is dissolved in 100 g of water at 25° C. after being dried at 105° C. for 2 hours. From the viewpoint of improving the continuous jetting properties and jetting stability of an ink, the dissolution amount thereof is preferably 10 g or less, more preferably 5 g or less, and still more preferably 1 g or less. The dissolution amount indicates a dissolution amount obtained by neutralizing the resin particles at a neutralization degree of 100% with sodium hydroxide or acetic acid depending on the type of a salt-forming group of the resin particles which are insoluble or sparingly soluble in water.

As the resin particles, particles of a thermoplastic resin, a thermosetting resin, or a modified acrylic resin, an epoxy resin, a polyurethane resin, a polyether resin, a polyamide resin, an unsaturated polyester resin, a phenolic resin, a silicone resin, or a fluorine resin, a polyvinyl resin such as vinyl chloride, vinyl acetate, polyvinyl alcohol, or polyvinyl butyral, a polyester resin such as an alkyd resin or a phthalic acid resin, an amino resin such as a melamine resin, a melamine formaldehyde resin, an aminoalkyd co-condensation resin, or a urea resin, and particles of resins containing anionic groups such as copolymers or mixtures of these. Among these resin particles, anionic group-containing acrylic monomers are obtained by polymerizing acrylic monomers (anionic group-containing acrylic monomer) containing an anionic dissociable group other than a sulfo group and other monomers which can be copolymerized with anionic dissociable group-containing acrylic monomers as necessary, in a solvent. Examples of the anionic dissociable group-containing acrylic monomer include an acrylic monomer containing one or more selected from the group consisting of a carboxy group and a phosphonic acid group. Among these, acrylic monomers (such as acrylic acid, methacrylic acid, crotonic acid, ethaacrylic acid, propylacrylic acid, isopropylacrylic acid, itaconic acid, and fumaric acid) having a carboxy group are preferable and acrylic acid and methacrylic acid are particularly preferable.

It is preferable that the resin particles are self-dispersing resin particles (self-dispersing resin particles) from the viewpoints of jetting stability and liquid stability (particularly dispersion stability) of a system containing a colorant. Here, the self-dispersing resin indicates a water-insoluble polymer which may be in a state of being dispersed in an aqueous medium by a functional group (particularly a hydrophilic group such as an acidic group or a salt thereof) included in a polymer when the polymer is set to be in a dispersion state using a phase-transfer emulsification method in the absence of a surfactant.

Here, the dispersion state includes both of an emulsion state (emulsion) formed by a water-insoluble polymer being dispersed in an aqueous medium in a liquid state and a dispersion state (suspension) formed by a water-insoluble polymer being dispersed in an aqueous medium in a solid state.

In addition, the aqueous medium indicates a medium containing water. The aqueous medium may contain a hydrophilic organic solvent as necessary. It is preferable that the aqueous medium contains water and a hydrophilic organic solvent at a content of 0.2% by mass or less with respect to water and more preferable that the aqueous medium contains only water.

From the viewpoints of the aggregation rate and fixing properties in a case where the self-dispersing resin is contained in the ink composition, self-dispersing resin particles in which a water-insoluble polymer can be dispersed in a solid state are preferable as the self-dispersing resin.

As the method of obtaining an emulsified or dispersion state of the self-dispersing resin, that is, a method of preparing an aqueous dispersion of the self-dispersing resin particles, a phase-transfer emulsification method is exemplified.

As the phase-transfer emulsification method, a method of dissolving or dispersing a self-dispersing resin in a solvent (for example, a water-soluble organic solvent), putting the resultant in water without adding a surfactant thereto, stirring and mixing the solution in a state in which a salt-forming group (for example, an acidic group) included in the self-dispersing resin is neutralized, and removing the solvent therefrom to obtain an aqueous dispersion in an emulsified or dispersion state is exemplified.

Further, a stable emulsified or dispersion state of the self-dispersing resin indicates a state (that is, the state in which precipitation cannot be confirmed visually) in which an emulsified or dispersion state is stably maintained at 25°

C. for at least one week even after a solution obtained by dissolving 30 g of a water-insoluble polymer in 70 g of an organic solvent (for example, methyl ethyl ketone), a neutralizing agent (sodium hydroxide in a case where the salt-forming group is anionic and acetic acid in a case where the salt-forming group is cationic) which is capable of neutralizing a salt-forming group of the water-insoluble polymer at a neutralization degree of 100%, and 200 g of water are mixed and stirred (device: stirring device provided with stirring blades, rotation speed of 200 rpm, 30 minutes, 25° C.) and then the organic solvent is removed from the mixed solution.

In addition, the stability of the emulsified or dispersion state of the self-dispersing resin can be confirmed by performing a sedimentation acceleration test using centrifugation. The stability confirmed by the sedimentation acceleration test using centrifugation can be evaluated by adjusting the concentration of solid contents of the aqueous dispersion of resin particles obtained by the above-described method to 25% by mass, performing centrifugation at 12000 rpm for one hour, and measuring the concentration of solid contents of the supernatant after the centrifugation.

When the ratio of the concentration of solid contents after the centrifugation to the concentration of solid contents before the centrifugation is large (when the numerical value is close to 1), this means that sedimentation of resin particles due to centrifugation does not occur, that is, the aqueous dispersion of the resin particles becomes more stable. The ratio between the concentrations of solid contents before and after the centrifugation is preferably 0.8 or greater, more preferably 0.9 or greater, and particularly preferably 0.95 or greater.

When the self-dispersing resin is in the dispersion state, the content of a water-soluble component showing water solubility is preferably 10% by mass or less, more preferably 8% by mass or less, and still more preferably 6% by mass or less. When the content of the water-soluble component is 10% by mass or less, it is possible to effectively suppress swelling of resin particles and fusion welding of resin particles and to more stably maintain the dispersion state. Further, an increase in viscosity of the ink composition can be suppressed, and the jetting stability becomes more excellent in a case where the ink composition is applied to an inkjet method.

The water-soluble component is a compound to be contained in the self-dispersing resin. In other words, the water-soluble component indicates a compound to be dissolved in water in a case where the self-dispersing resin is set to be in the dispersion state. The water-soluble component is a water-soluble compound which is created as a by-product or mixed into in a case where the self-dispersing resin is produced.

A main chain skeleton of the water-insoluble polymer is not particularly limited, and a vinyl polymer or a condensation type polymer (such as an epoxy resin, polyester, polyurethane, polyamide, cellulose, polyether, polyurea, polyimide, or polycarbonate) can be used. Among these, a vinyl polymer is particularly preferable.

Preferred examples of a vinyl polymer and a monomer constituting a vinyl polymer include those described in JP2001-181549A and JP2002-88294A. Further, a vinyl polymer obtained by introducing a dissociable group to a terminal of a polymer chain by performing radical polymerization on a vinyl monomer using a chain transfer agent, a polymerization initiator, and an iniferter which have a dissociable group (or a substituent which can be induced to a dissociable group) or performing ion polymerization using a compound having a dissociable group (or a substituent which can be induced to a dissociable group) in either of a initiator or a terminator can be used.

Further, preferred examples of a condensation type polymer and a monomer constituting a condensation type polymer include those described in JP2001-247787A.

From the viewpoint of dispersion stability, it is preferable that the resin particles contain a water-insoluble polymer which has a hydrophilic constitutional unit and a constitutional unit derived from an aromatic group-containing monomer or a cyclic aliphatic group-containing monomer.

The "hydrophilic constitutional unit" is not particularly limited as long as the constitutional unit is derived from a hydrophilic group-containing monomer, and the constitutional unit may be a constitutional unit derived from one hydrophilic group-containing monomer or a constitutional unit derived from two or more hydrophilic group-containing monomers. The hydrophilic group is not particularly limited except for a sulfo group and may be a dissociable group or a non-ionic hydrophilic group.

From the viewpoint of the stability of the formed emulsified or dispersion state, as the hydrophilic group, a dissociable group is preferable and an anionic dissociable group is more preferable.

That is, resin particles containing an anionic dissociable group are preferable as the resin particles.

Examples of the dissociable group include a carboxy group and a phosphoric acid group. Among these, from the viewpoint of the fixing properties in a case of constituting the ink composition, a carboxy group is preferable.

From the viewpoint of the dispersion stability and aggregating properties, as the hydrophilic group-containing monomer, a dissociable group-containing monomer is preferable and a dissociable group-containing monomer that contains a dissociable group and an ethylenically unsaturated bond is more preferable.

Examples of the dissociable group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated phosphoric acid monomer include vinylphosphonic acid, vinyl phosphate, bis(methacryloxyethyl) phosphate, diphenyl-2-acryloxyethyl phosphate, diphenyl-2-methacryloxyethyl phosphate, and dibutyl-2-acryloxyethyl phosphate.

Among the dissociable group-containing monomers, from the viewpoints of the dispersion stability and the jetting stability, an unsaturated carboxylic acid monomer is preferable and acrylic acid and methacrylic acid are more preferable.

From the viewpoint of the dispersion stability and the aggregation rate when the resin particles are brought into contact with the pre-treatment liquid, it is preferable that the resin particles contain a polymer containing a carboxy group and more preferable that the resin particles contain a polymer which contains a carboxy group and has an acid value of 25 mgKOH/g to 100 mgKOH/g. Further, from the viewpoint of the self-dispersibility and the aggregation rate when the resin particles are brought into contact with the pre-treatment liquid, the acid value is more preferably in a range of from 25 mgKOH/g to 80 mgKOH/g and particularly preferably in a range of from 30 mgKOH/g to 65 mgKOH/g.

Particularly, when the acid value thereof is 25 mgKOH/g or greater, the dispersion stability becomes excellent. Further, when the acid value thereof 100 mgKOH/g or less, the aggregation rate is improved.

Further, the acid value can be measured using a method described in Japanese Industrial Standards (JIS K0070: 1992).

The aromatic group-containing monomer is not particularly limited as long as the aromatic group-containing monomer is a compound containing an aromatic group and a polymerizable group. The aromatic group may be a group derived from aromatic hydrocarbon or a group derived from an aromatic heterocycle. From the viewpoint of stability of the particle shape in an aqueous medium, it is preferable that the aromatic group is an aromatic group derived from aromatic hydrocarbon.

Further, the polymerizable group may be a polymerizable group which is condensation-polymerizable or a polymerizable group which is addition-polymerizable. From the viewpoint of stability of the particle shape in an aqueous medium, as the polymerizable group, a polymerizable group which is addition-polymerizable is preferable and a group containing an ethylenically unsaturated bond is more preferable.

It is preferable that the aromatic group-containing monomer is a monomer containing an ethylenically unsaturated bond and an aromatic group derived from aromatic hydrocarbon. The aromatic group-containing monomer may be used alone or in combination of two or more kinds thereof.

Examples of the aromatic group-containing monomer include phenoxyethyl (meth)acrylate, benzyl (meth)acrylate, phenyl (meth)acrylate, and a styrene-based monomer. Among these, from the viewpoints of the balance between hydrophilicity and hydrophobicity of the polymer chain and ink fixing properties, an aromatic group-containing (meth) acrylate monomer is preferable, at least one selected from phenoxyethyl (meth)acrylate, benzyl (meth)acrylate, and phenyl (meth)acrylate are more preferable, and phenoxyethyl (meth)acrylate and benzyl (meth)acrylate are still more preferable.

As the cyclic aliphatic group-containing monomer, a monomer containing a cyclic aliphatic group derived from cyclic aliphatic hydrocarbon and an ethylenically unsaturated bond is preferable and a cyclic aliphatic group-containing (meth)acrylate monomer (hereinafter, also referred to as alicyclic (meth)acrylate is more preferable).

The alicyclic (meth)acrylate is a compound which includes a constitutional site derived from (meth)acrylic acid and a constitutional site derived from alcohol and has a structure containing at least one substituted or unsubstituted alicyclic hydrocarbon group (cyclic aliphatic group) in the constitutional site derived from alcohol. Further, the alicyclic hydrocarbon group may be the constitutional site derived from alcohol or may be bonded to the constitutional site derived from alcohol through a linking group.

The alicyclic hydrocarbon group is not particularly limited as long as the group is a hydrocarbon group containing a cyclic non-aromatic hydrocarbon group, and examples thereof include a monocyclic hydrocarbon group, a bicyclic hydrocarbon group, and a tricyclic or higher polycyclic hydrocarbon group. Examples of the alicyclic hydrocarbon group include cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricycle[5.2.1.0$^{2,6}$]decanyl group, and bicycle[4.3.0] nonane.

The alicyclic hydrocarbon group may further include a substituent. Examples of the substituent include an alkyl group, an alkenyl group, an aryl group, an aralkyl group, an alkoxy group, a hydroxyl group, a primary amino group, a secondary amino group, a tertiary amino group, an alkyl or arylcarbonyl group, and a cyano group. In addition, the alicyclic hydrocarbon group may form a fused ring. From the viewpoint of the viscosity or solubility, the number of carbon atoms of the alicyclic hydrocarbon group portion in the alicyclic hydrocarbon group is preferably in a range of from 5 to 20.

Specific examples of the alicyclic (meth)acrylate will be described below. However, the embodiment of the present invention is not limited to these.

Examples of the monocyclic (meth)acrylate include cycloalkyl (meth)acrylate containing a cycloalkyl group having 3 to 10 carbon atoms such as cyclopropyl (meth) acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and norbornyl (meth)acrylate.

Examples of the tricyclic (meth)acrylate include adamantly (meth)acrylate, dicyclopentanyl (meth)acrylate, and dicyclopentenyloxyethyl (meth)acrylate.

These may be used alone or in combination of two or more kinds thereof.

Among these, from the viewpoints of dispersion stability, fixing properties, and blocking resistance of resin particles, at least one selected from bicyclic (meth)acrylate and tricyclic or higher polycyclic (meth)acrylate is preferable and at least one selected from isobornyl (meth)acrylate, adamantly (meth)acrylate, and dicyclopentanyl (meth)acrylate is more preferable.

As the resin used to form resin particles, an acrylic resin having a constitutional unit derived from a (meth)acrylate monomer is preferable and an acrylic resin having a constitutional unit derived from an aromatic group-containing (meth)acrylate monomer or aliphatic (meth)acrylate is more preferable. Further, it is still more preferable that the resin particles have a constitutional unit derived from an aromatic group-containing (meth)acrylate monomer or aliphatic (meth)acrylate and the content thereof is in a range of from 10% by mass to 95% by mass. When the content of the aromatic group-containing (meth)acrylate monomer or the aliphatic (meth)acrylate is in a range of from 10% by mass to 95% by mass, emulsification or the stability of the dispersion state is improved and an increase in ink viscosity can be suppressed.

From the viewpoints of stability of the dispersion state, stabilization of the particle shape in the aqueous medium using the hydrophobic interaction between aromatic rings and alicycles, and a decrease in amount of water-soluble components due to appropriate hydrophobization of particles, the content of the aromatic group-containing (meth) acrylate monomer or the alicyclic (meth)acrylate is more preferably in a range of from 15% by mass to 90% by mass, more preferably in a range of from 15% by mass to 80% by mass, and particularly preferably in a range of from 25% by mass to 70% by mass.

A resin used to form resin particles can be formed using a constitutional unit derived from an aromatic group-containing monomer or an alicyclic aliphatic group-containing monomer and a constitutional unit derived from a dissociable group-containing monomer. Further, the resin may further other constitutional units as necessary.

The monomers forming other constitutional units are not particularly limited as long as the monomers can be copolymerized with an aromatic group-containing monomer and a dissociable group-containing monomer. Among these, from the viewpoints of flexibility of a polymer skeleton or ease of controlling the glass transition temperature (Tg), an alkyl group-containing monomer is preferable.

Examples of the alkyl group-containing monomer include alkyl(meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylaminoethyl (meth)acrylate; and (meth)acryl amide, for example, N-hydroxyalkyl (meth)acrylamide such as N-hydroxymethyl (meth)acrylamide, N-hydroxyethyl (meth)acryl amide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-,iso)butoxymethyl (meth)acrylamide, N-methoxyethyl (meth)acrylamide, N-ethoxyethyl (meth)acrylamide, or N-(n-,iso)butoxyethyl (meth)acryl amide.

The weight-average molecular weight of the water-insoluble polymer that forms resin particles is preferably in a range of from 3000 to 200000, more preferably in a range of from 5000 to 150000, and still more preferably in a range of from 10000 to 100000. When the weight-average molecular weight thereof is 3000 or greater, the amount of water-soluble components can be effectively suppressed. Further, the weight-average molecular weight thereof is 200000 or less, the dispersion stability can be improved.

In addition, the weight-average molecular weight can be measured using a known method.

From the viewpoint of controlling hydrophobicity of the polymer, it is preferable that the water-insoluble polymer that forms resin particles includes a constitutional unit derived from an aromatic group-containing (meth)acrylate monomer (preferably a constitutional unit derived from phenoxyethyl (meth)acrylate and/or a constitutional unit derived from benzyl (meth)acrylate) or a cyclic aliphatic group-containing monomer (preferably alicyclic (meth)acrylate) at a copolymerization ratio of 15% by mass to 80% by mass with respect to the total mass of the resin particles.

In addition, from the viewpoint of controlling hydrophobicity of the polymer, it is preferable that the water-insoluble polymer includes a constitutional unit derived from an aromatic group-containing (meth)acrylate monomer or an alicyclic (meth)acrylate monomer at a copolymerization ratio of 15% by mass to 80% by mass, a constitutional unit derived from a carboxy group-containing monomer, and a constitutional unit derived from an alkyl group-containing monomer (preferably a constitutional unit derived from alkyl ester of (meth)acrylic acid) and more preferable that the water-insoluble polymer includes a constitutional unit derived from phenoxyethyl (meth)acrylate and/or a constitutional unit derived from benzyl (meth)acrylate at a copolymerization ratio of 15% by mass to 80% by mass, a constitutional unit derived from a carboxy group-containing monomer, and a constitutional unit derived from an alkyl group-containing monomer (preferably a constitutional unit derived from alkyl ester of (meth)acrylic acid having 1 to 4 carbon atoms).

It is preferable that the acid value of the water-insoluble polymer is in a range of from 25 mgKOH/g to 100 mgKOH/g and the weight-average molecular weight thereof is in a range of from 3000 to 200000 and more preferable that the acid value of the water-insoluble polymer is in a range of from 25 mgKOH/g to 95 mgKOH/g and the weight-average molecular weight thereof is in a range of from 5000 to 150000. The acid value and the weight-average molecular weight can be measured using known methods.

Hereinafter, specific examples of the water-insoluble polymer (exemplary compounds B-01 to B-23) will be described. However, the embodiment of the present invention is not limited thereto. Further, the mass ratios of copolymer components are shown in the parentheses.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

B-20: methyl methacrylate/isobornyl methacrylate/acrylic acid copolymer (20/72/8)

B-21: methyl methacrylate/isobornyl methacrylate/acrylic acid copolymer (40/52/8)

B-22: methyl methacrylate/isobornyl methacrylate/dicyclopentanyl methacrylate/methacrylic acid copolymer (20/62/10/8)

B-23: methyl methacrylate/dicyclopentanyl methacrylate/methacrylic acid copolymer (20/72/8)

The method of producing the water-insoluble polymer contained in the resin particles is not particularly limited, and examples thereof include a method of performing emulsion polymerization in the presence of a polymerizable surfactant and covalently bonding a surfactant and a water-insoluble polymer to each other; a solution polymerization method of performing polymerization on a monomer mixture that contains the hydrophilic group-containing monomer and the aromatic group-containing monomer or the alicyclic group-containing monomer; and a method of copolymerization using a known polymerization method such as a bulk polymerization method. Among these polymerization methods, from the viewpoints of aggregation rate and jetting stability at the time of ejecting an ink composition, the solution polymerization method is preferable and a solution polymerization method using an organic solvent is more preferable.

From the viewpoint of the aggregation rate, it is preferable that the resin particles contain a polymer synthesized in an organic solvent, the polymer includes an anionic group (a carboxy group), a part or the entirety of the anionic group (carboxy group) of the polymer (preferably the acid value is in a range of from 20 mgKOH/g to 100 mgKOH/g) is neutralized, and the neutralized group is prepared as a polymer dispersion using water as a continuous phase.

In other words, it is preferable that the resin particles are produced by performing a step of synthesizing a polymer in an organic solvent and a dispersion step of obtaining an aqueous dispersion in which at least a part of the anionic group (a carboxy group) of the polymer is neutralized.

It is preferable that the dispersion step includes the following step (1) and step (2).

Step (1): step of stirring a mixture that contains a polymer (water-insoluble polymer), an organic solvent, a neutralizing agent, and an aqueous medium Step (2): step of removing the organic solvent from the mixture It is preferable that the step (1) is a treatment of dissolving the polymer (water-insoluble polymer) in the organic solvent, gradually adding a neutralizing agent and an aqueous medium thereto, and mixing and stirring the solution to obtain a dispersion material. In this manner, resin particles having a particle diameter which may achieve excellent storage stability can be obtained by adding a neutralizing agent and an aqueous medium to the water-insoluble polymer solution dissolved in an organic solvent without requiring strong shear force.

The method of stirring the mixture is not particularly limited, and a mixing and stirring device which is typically used and dispersers such as an ultrasonic disperser and a high pressure homogenizer can be used as necessary.

Further, in the step (2), an aqueous dispersion of resin particles can be obtained by distilling the organic solvent using a conventional method, for example, distillation under reduced pressure from the dispersion material obtained from the step (1) and performing phase transfer into a water system. The organic solvent in the obtained aqueous dispersion is substantially removed and the amount of organic solvent is preferably 0.2% by mass or less and more preferably 0.1% by mass or less.

Preferred examples of the organic solvent include an alcohol-based solvent, a ketone-based solvent, and an ether-based solvent. As the organic solvent, organic solvents exemplified in paragraph 0059 of JP2010-188661A can be used.

As the neutralizing agent, neutralizing agents exemplified in paragraphs 0060 and 0061 of JP2010-188661A can be used.

The volume average particle diameter of the resin particles (particularly, self-dispersing resin particles) is preferably in a range of from 10 nm to 400 nm, more preferably in a range of from 10 nm to 200 nm, still more preferably in a range of from 10 nm to 100 nm, and particularly preferably in a range of from 10 nm to 50 nm. When the volume average particle thereof is 10 nm or greater, the production suitability is improved. Further, the volume average particle diameter thereof is 400 nm or less, the storage stability is improved. Moreover, the particle size distribution of the resin particles is not particularly limited, and any of resin particles having wide particle size distribution and resin particles having monodisperse particle size distribution may be used. In addition, the resin particles may be used in combination of two or more kinds thereof.

Further, the average particle diameter and the particle size distribution of the resin particles are acquired by measuring the volume average particle diameter using a nanotrac particle size distribution measurement apparatus UPA-EX150 (manufactured by Nikkiso Co., Ltd.) according to a dynamic light scattering method.

The ink composition may contain one or two or more kinds of resin particles (preferably self-dispersing resin particles).

From the viewpoint of glossiness of an image, the content (total content) of the resin particles (preferably self-dispersing resin particles) in the ink composition is preferably in a range of from 1% by mass to 30% by mass and more preferably in a range of from 3% by mass to 15% by mass with respect to the total amount of the ink composition.

—Water—

The ink composition contains water and is prepared as an aqueous composition. As water, ion exchange water or the like can be used.

The content of water is not particularly limited, but is preferably in a range of from 10% by mass to 99% by mass, more preferably in a range of from 30% by mass to 80% by mass, and still more preferably in a range of from 50% by mass to 80% by mass with respect to the total mass of the ink composition.

—Other Components—

The ink composition may contain components other than the components described above.

[Organic Solvent]

It is more preferable that the ink composition further contains at least one organic solvent (preferably a water-soluble organic solvent). When the organic solvent contains particularly a water-soluble organic solvent, it is possible to prevent the ink composition from being dried and to promote penetration of the ink composition.

In a case where the water-soluble organic solvent is used as an anti-drying agent, it is possible to effectively prevent nozzle clogging which may occur due to the drying of an ink at an ink ejection opening in a case where the ink composition is ejected according to an inkjet method for recording an image.

In order to prevent the ink composition from being dried, a water-soluble organic solvent having a lower vapor pressure than that of water is preferable. Specific examples of a preferred water-soluble organic solvent for the purpose of preventing the ink composition from being dried include polyalcohols such as ethylene glycol, propylene glycol, diethylene glycol, polyethylene glycol, thiodigylcol, dithiodigylcol, 2-methyl-1,3-propanediol, 1,2,6-hexanetriol, an acetylene glycol derivative, glycerin, and trimethylol propane; lower alkyl ethers of polyhydric alcohol such as ethylene glycol monomethyl (or ethyl) ether, diethylene glycol monomethyl (or ethyl) ether, triethylene glycol monoethyl (or butyl) ether, and tripropylene glycol monomethyl (or ethyl) ether; heterocycles such as 2-pyrrolidone, N-methyl-2-pyrrolidone, 1,3-dimethyl-2-imidazolidinone, and N-ethyl morpholine; sulfur-containing compounds such as sulfolane, dimethyl sulfoxide, and 3-sulfolene; polyfunctional compounds such as diacetone alcohol and diethanolamine; and urea derivatives.

Among these water-soluble organic solvents, polyhydric alcohol such as glycerin and diethylene glycol are preferable. Further, these may be used alone or in combination of two or more kinds thereof.

The content of the organic solvent is preferably in a range of from 10% by mass to 50% by mass of with respect to the total mass of the ink composition.

In order to promote penetration of the ink composition, a water-soluble organic solvent is preferably used from the viewpoint of penetration of the ink composition to the image recording material. Specific examples of the water-soluble organic solvent which is preferable for promoting penetration include alcohols such as ethanol, isopropanol, butanol, di(tri)ethylene glycol monobutyl ether, tripropylene glycol monomethyl (or ethyl) ether, and 1,2-hexanediol. When the ink composition contains 5% by mass to 30% by mass of these, excellent effects are obtained. Further, it is preferable that the amount of these water-soluble organic solvents is in a range in which blurring of printed characters and images or page omission (print through) does not occur.

Further, the water-soluble organic solvent can be used to adjust the viscosity other than the applications described above. Specific examples of the water-soluble organic solvent which can be used to adjust the viscosity include alcohol (for example, methanol, ethanol, propanol, isopropanol, butanol, isobutanol, sec-butanol, t-butanol, pentanol, hexanol, cyclohexanol, or benzyl alcohol), polyvalent alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), amine (for example, ethanolamine, diethanolamine, triethanolamine, N-methyl diethanolamine, N-ethyl diethanolamine, morpholine, N-ethyl morpholine, ethylene diamine, diethylene triamine, triethylene tetramine, polyethyleneimine, or tetramethyl propylene diamine), and other polar solvents (for example, formamide, N,N-dimethyl formamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Further, the water-soluble organic solvents may be used alone or two or more kinds thereof.

[Surfactant]

The ink composition may contain at least one surfactant. Examples of the surfactant include a non-ionic surfactant, a cationic surfactant, an anionic surfactant, and a betaine surfactant. From the viewpoint of the aggregation rate, an anionic surfactant or a non-ionic surfactant is preferable.

From the viewpoint of satisfactorily ejecting the ink composition using an inkjet method, it is preferable that the amount of the surfactant to be contained in the ink composition is set such that the surface tension of the ink composition can be adjusted to be in a range of from 25 mN/m to 40 mN/m. Among the examples of the ranges, it is preferable that the content of the surfactant is set such that the surface tension thereof can be adjusted to be in a range of from 27 mN/m to 37 mN/m.

Further, these surfactants can be used as an anti-foaming agent. As the surfactants, chelating agents typified by a fluorine-based compound, a silicone-based compound, and ethylenediaminetetraacetic acid (EDTA) can be used.

[Other Additives]

The ink composition may further contain other additives in addition to the components described above. Examples of other additives include known additives such as a discoloration preventer, an emulsification stabilizer, a penetration enhancer, an ultraviolet absorbing agent, a preservative, an antifungal agent, a pH adjusting agent, an antifoaming agent, a viscosity adjusting agent, a dispersion stabilizer, a rust inhibitor, and a chelating agent. These various additives may be directly added after preparation of the ink composition or added during the preparation of the ink composition.

As the pH adjusting agent, a neutralizing agent (an organic base or inorganic alkali) can be used. From the viewpoint of improving the storage stability of the ink composition, it is preferable that the pH adjusting agent is added to the ink composition such that the pH of the ink composition is adjusted to be in a range of from 6 to 10 and more preferable that the pH adjusting agent is added to the ink composition such that the pH of the ink composition is adjusted to be in a range of from 7 to 10.

From the viewpoints of jetting stability in a case of ejecting an ink using an inkjet method and the aggregation rate when a pre-treatment liquid described below is used, the viscosity of the ink composition is preferably in a range of from 1 mPa·s to 30 mPa·s, more preferably in a range of from 1 mPa·s to 20 mPa·s, still more preferably in a range of from 2 mPa·s to 15 mPa·s, and particularly preferably in a range of from 2 mPa·s to 10 mPa·s.

The viscosity of the ink composition is obtained by measuring the ink composition under a temperature condition of 25° C. using VISCOMETER TV-22 (manufactured by TOKI SANGYO CO., LTD.).

Hereinbefore, the ink set of the embodiment of the present invention has been described, but the ink set according to the embodiment of the present invention may contain at least one ink composition, at least one pre-treatment liquid, and at least one overcoat liquid and may further contain other liquids.

Examples of preferred configurations of the ink set include a configuration (three color configuration) formed of a combination of a cyan ink serving as an ink composition, a magenta ink serving as an ink composition, a yellow ink serving as an ink composition, and a pre-treatment liquid; and a configuration (four color configuration) formed of a combination of a black ink serving as an ink composition, a cyan ink serving as an ink composition, a magenta ink serving as an ink composition, a yellow ink serving as an ink composition, and a pre-treatment liquid.

Here, the ink set may be an ink set with one color configuration or a two color configuration formed of a pre-treatment liquid and one or two ink compositions.

Further, the ink set may contain other ink compositions as necessary, for example, at least one ink selected from light cyan ink, light magenta ink, and light yellow ink in addition to the above-described ink compositions. As other ink compositions, known ink compositions can be employed without particularly limitation.

Further, the ink set may contain two or more pre-treatment liquids as necessary.

In a case where the ink set contains two or more ink compositions, at least one ink composition may contain a colorant (preferably a pigment).

—Pre-Treatment Liquid—

The pre-treatment liquid contains an acid and water and may further contain other components as necessary. The pre-treatment liquid may further contain other components such as an organic solvent, a nitrogen-containing heterocyclic compound, an anti-foaming agent, and other additives as necessary.

(Acid)

The pre-treatment liquid contains at least one kind of acid as a compound (aggregation compound) that aggregates at least the colorant contained in the ink composition. The pre-treatment liquid containing an acid acts on at least the colorant in which an acid serves as a dispersion component in the ink composition by bringing the pre-treatment liquid and the ink composition into contact with each other at the time of image formation so that the colorant aggregates. Therefore, a sharper image is obtained.

As an acid, an organic acidic compound and an inorganic acidic compound that may decrease the pH of the ink composition may be exemplified.

The organic acidic compound is not particularly limited, and examples thereof include compounds containing a phosphoric acid group, a phosphonic acid group, a phosphinic acid group, a sulfuric acid group, a sulfonic acid group, a sulfinic acid group, and a carboxy group. From the viewpoint of aggregation rate of the ink composition, as the organic acidic compound, a compound containing a phosphoric acid group or a carboxy group is preferable and a compound containing a carboxy group is more preferable.

Preferred examples of the compound containing a carboxy group include polyacrylic acid, acetic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts of these (for example, polyvalent metal salts). These compounds may be used alone or in combination of two or more kinds thereof.

From the viewpoint of the aggregation rate of the ink composition, as the compound containing a carboxy group, at least one polyvalent carboxylic acid selected from a di- or higher valent carboxylic acid (hereinafter, also referred to as polyvalent carboxylic acid) is preferable, malonic acid, malic acid, maleic acid, succinic acid, glutaric acid, fumaric acid, tartaric acid, 4-methylphthalic acid, and citric acid is more preferable, and malonic acid, malic acid, tartaric acid, and citric acid are particularly preferable.

It is preferable that the organic acidic compound has a low pKa. The surface charge of particles of a pigment or polymer particles in the ink composition in which the particles are stably dispersed due to a weakly acidic functional group such as a carboxy group is decreased by bringing the particles into contact with an organic acidic compound having a lower pKa than the pKa of the particles and the dispersion stability can be degraded.

As the organic acidic compound, an acidic compound which has a low pKa, high solubility in water, and a valence of divalent or higher is preferable and a divalent or trivalent acidic compound with high buffer capacity in a pH region having a lower pKa than the pKa of a functional group (for example, a carboxy group) that allows the particles to be stably dispersed in the ink composition is more preferable.

Examples of the inorganic acidic compound include phosphoric acid, a phosphoric acid compound, nitric acid, nitrous acid, sulfuric acid, and hydrochloric acid. From the viewpoints of suppressing graininess of an image and improving the aggregation rate of an ink, phosphoric acid or a phosphoric acid compound are preferable as the inorganic acidic compound.

The solubility (25° C.) of phosphoric acid in water when turned into calcium salt (calcium phosphate) is 0.0018 g per 100 g of water, which is small. Therefore, when the inorganic acidic compound contained in the pre-treatment liquid is phosphoric acid, calcium salt is not dissolved in the pre-treatment liquid and solidified and the effects of suppressing occurrence of graininess on the surface of an image portion are excellent. Particularly, phosphoric acid is advantageous as the inorganic acidic compound contained in the pre-treatment liquid in a case where a recording medium that includes a coating layer containing calcium carbonate is used as a recording medium.

As the phosphoric acid compound, phosphorous acid, hypophosphorous acid, pyrophosphoric acid, metaphosphoric acid, polyphosphoric acid, and salts of these can be used.

In the pre-treatment liquid, the acid may be used alone or in combination of two or more kinds thereof.

The total content of the acid in the pre-treatment liquid is preferably in a range of from 5% by mass to 40% by mass and more preferably in a range of from 10% by mass to 30% by mass with respect to the total mass of the pre-treatment liquid. When the content of the aggregation components is 5% by mass or greater, the graininess of an image can be suppressed. Further, when the content of the aggregation component is 40% by mass or less, the rub resistance of an image is improved.

In a case where a combination of an organic acidic compound and an inorganic acidic compound is used as the aggregating component, from the viewpoints of improving the aggregation rate and suppressing the graininess, the content of the inorganic acidic compound to the content of the organic acidic compound is preferably in a range of from 5 mol % to 50 mol %, more preferably in a range of from 10 mol % to 40 mol %, and still more preferably in a range of from 15 mol % to 35 mol % in the ratio between the content of the organic acidic compound and the content of the inorganic acidic compound.

(Water)

The pre-treatment liquid contains water and is prepared as an aqueous composition. As water, for example, ion exchange water or the like can be used.

The content of water is not particularly limited, but is preferably in a range of from 10% by mass to 99% by mass, more preferably in a range of from 50% by mass to 90% by mass, and still more preferably in a range of from 60% by mass to 80% by mass with respect to the total mass of the pre-treatment liquid.

—Other Components—

The pre-treatment liquid may contain components other than the components described above. Examples of other components include an organic solvent, a nitrogen-containing heterocyclic compound, an anti-foaming agent, and other additives as necessary.

[Organic Solvent]

It is preferable that the pre-treatment liquid contains at least one organic solvent.

As the organic solvent, an organic solvent (hereinafter, also referred to as a "water-soluble organic solvent") to be dissolved in 100 g of water at 20° C. by an amount of 5 g or greater is preferable.

As the water-soluble organic solvent, a solvent which is the same as the water-soluble organic solvent contained in the ink composition described below can be used. Among the examples of the organic solvent, from the viewpoint of curl suppression, polyalkylene glycol or a derivative thereof is preferable and at least one selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

The content of the organic solvent in the pre-treatment liquid is not particularly limited, but is preferably in a range of from 1% by mass to 30% by mass and more preferably in a range of from 5% by mass to 15% by mass with respect to the total amount of the pre-treatment liquid from the viewpoint of curl suppression.

[Nitrogen-Containing Heterocyclic Compound]

The pre-treatment liquid may contain a nitrogen-containing heterocyclic compound. In this manner, the rub resistance of an image and the transportability of the image recording material are improved.

As the heterocyclic structure of the nitrogen-containing heterocyclic compound, a nitrogen-containing 5-membered ring structure or a nitrogen-containing 6-membered ring structure is preferable. Among these, a nitrogen-containing 5-membered ring structure is preferable.

In the nitrogen-containing 5-membered ring structure or the nitrogen-containing 6-membered ring structure, a 5- or 6-membered heterocyclic structure containing at least one atom preferably selected from a carbon atom, a nitrogen atom, an oxygen atom, a sulfur atom, and a selenium atom is preferable. Further, this heterocycle may be condensed with a carbon aromatic ring or a heteroaromatic ring.

Examples of the heterocycle include a tetrazole ring, a triazole ring, an imidazole ring, a thiadiazole ring, an oxadiazole ring, a selenadiazole ring, an oxadiazole ring, a thiazole ring, a benzoxazole ring, a benzothiazole ring, a benzimidazole ring, a pyrimidine ring, a triazaindene ring, a tetraazaindene ring, and a pentaazaindene ring.

The heterocycle may contain a substituent. Examples of the substituent include a nitro group, a halogen atom (such as a chlorine atom or a bromine atom), a mercapto group, a cyano group, a substituted or unsubstituted alkyl group (such as each group of methyl, ethyl, propyl, t-butyl, or cyanoethyl), a substituted or unsubstituted aryl group (such as each group of phenyl, 4-methanesulfonamide phenyl, 4-methylphenyl, 3,4-dichlorophenyl, or naphthyl), a substituted or unsubstituted alkenyl group (such as an allyl group), a substituted or unsubstituted aralkyl group (such as each group of benzyl, 4-methylbenzyl, or phenethyl), a substituted or unsubstituted sulfonyl group (such as each group of methanesulfonyl, ethanesulfonyl, or p-toluenesulfonyl), a substituted or unsubstituted carbamoyl group (such as each group or unsubstituted carbamoyl, methyl carbamoyl, or phenyl carbamoyl), a substituted or unsubstituted sulfamoyl group (such as each group of unsubstitituted sulfamoyl, methyl sulfamoyl, or phenyl sulfamoyl), a substituted or unsubstituted carbonamide group (such as each group of acetamide or benzamide), a substituted or unsubstituted sulfonamide group (such as each group or methanesulfonamide, benzenesulfonamide, or p-toluenesulfonamide), a substituted or unsubstituted acyloxy group (such as each group of acetyloxy or benzoyloxy), a substituted or unsubstituted sulfonyloxy group (such as methanesulfonyloxy), a substituted or unsubstituted ureido group (such as each group of unsubstituted ureido, methylureido, ethylureido, or phenylureido), a substituted or unsubstituted acyl group (such as each group of acetyl or benzoyl), a substituted or unsubstituted oxycarbonyl group (such as each group of methoxycarbonyl or phenoxycarbonyl), a substituted or unsubstituted oxycarbonylamino group (such as each group of methoxycarbonylamino, phenoxycarbonylamino, or 2-ethylhexyloxycarbonylamino), and a substituted or unsubstituted hydroxyl group. A plurality of substituents may be substituted with one ring.

Preferred specific examples of the nitrogen-containing heterocyclic compound include imidazole, benzoimidazole, benzoindazole, benzotriazole, tetrazole, benzoxazole, benzothiazole, pyridine, quinoline, pyrimidine, piperidine, piperazine, quinoxaline, and morpholine. The nitrogen-containing heterocyclic compound may include these substituents such as an alkyl group, a carboxy group, and a sulfo group described above.

Preferred examples of the nitrogen-containing 6-membered ring compound include compounds including a triazine ring, a pyrimidine ring, a pyridine ring, a pyrroline ring, a piperidine ring, a pyridazine ring, or a pyrazine ring. Among these, compounds including a triazine ring or a pyrimidine ring are preferable. The nitrogen-containing 6-membered ring compound may include substituents. Examples of the substituents include an alkyl group having 1 to 6 carbon atoms (preferably an alkyl group having 1 to 3 carbon atoms), an alkoxy group having 1 to 6 carbon atoms (preferably an alkoxy group having 1 to 3 carbon atoms), a hydroxyl group, a carboxy group, a mercapto group, an alkoxyalkyl group having 1 to 6 carbon atoms (preferably an alkoxyalkyl group having 1 to 3 carbon atoms), and a hydroxyalkyl group having 1 to 6 carbon atoms (preferably a hydroxyalkyl group having 1 to 3 carbon atoms).

Preferred specific examples of the nitrogen-containing 6-membered ring compound include triazine, methyl triazine, dimethyl triazine, hydroxyethyl triazine ring, pyrimidine, 4-methylpyrimidine, pyridine, and pyrroline.

[Anti-Foaming Agent]

The pre-treatment liquid may contain an anti-foaming agent. Examples of the anti-foaming agent include a silicone-based compound (silicone-based anti-foaming agent), and a pluronic compound (pluronic anti-foaming agent). Among these, a silicone-based anti-foaming agent is preferable.

As the silicone-based anti-foaming agent, a silicone-based anti-foaming agent having a polysiloxane structure is preferable.

As the anti-foaming agent, commercially available anti-foaming agents can be used. Examples thereof include BYK-012, BYK-017, BYK-021, BYK-022, BYK-024, BYK-025, BYK-038, and BYK-094 (all manufactured by BYK Chemie GmbH), KS-537, KS-604, and KM-72F (all manufactured by Shin-Etsu Chemical Co., Ltd.), TSA-739 (manufactured by Momentive Performance Materials Inc.), and OLFINE AF104 (manufactured by Nissin Chemical Industry Co., Ltd.). Among these, BYK-017, BYK-021, BYK-022, BYK-024, BYK-025, BYK-094, KS-537, KS-604, KM-72F, and TSA-739 which are silicone-based anti-foaming agents are preferable. Among these, BYK-024 is particularly preferable from the viewpoint of jetting stability of an ink.

In a case where the pre-treatment liquid contains an anti-foaming agent, the content of the anti-foaming agent is preferably in a range of from 0.0001% by mass to 1% by mass and more preferably in a range of from 0.001% by mass to 0.1% by mass with respect to the total mass of the pre-treatment liquid.

In a case where a silicone-based anti-foaming agent is used as the anti-foaming agent, it is preferable that the content of the silicone-based anti-foaming agent to be contained in the pre-treatment liquid is adjusted such that the amount of silicone oil is set to be in a range of from 50 ppm to 200 ppm.

[Water-Insoluble Resin]

The pre-treatment liquid may contain at least one kind of the water-insoluble resin particles.

When the pre-treatment liquid contains the water-insoluble resin particles, most of the water-insoluble resin particles are unevenly distributed in the surface of the image recording material after the pre-treatment liquid is applied so that the wettability of the surface of the image recording material is improved.

Accordingly, ink droplets wet-spread over the surface of the image recording material in a case where the ink composition is impacted on the image recording material, whose surface has unevenly distributed water-insoluble resin particles, and the aggregation component contained in the pre-treatment liquid aggregate dispersion components (for example, the colorant) in the ink composition. In this manner, the liquid droplets are prevented from being united and the size of liquid droplets becomes the target size. As the result, a solid image portion which has a desired density by suppressing a decrease in density of the solid image portion is obtained.

As described above, it is effective that the pre-treatment liquid contains the water-insoluble resin particles from the viewpoint that the temporal stability of the water-insoluble resin particle in the pre-treatment liquid is excellent, the roughening of the particles due to swelling is suppressed, and occurrence of streak unevenness that easily occurs in a recorded image is suppressed. Further, the graininess in the image can be also suppressed.

Further, the "graininess" indicates a phenomenon in which extremely small density unevenness occurs in an image so that the uniformity of pixels is degraded because liquid droplets are united after the ink composition is impacted on the image recording material.

The term "water-insoluble" of the water-insoluble resin has the same definition as the "water-insoluble" of the resin (water-insoluble resin) in the "resin particles" contained in the overcoat layer described above.

Further, the water-insoluble resin in the water-insoluble resin particles may include at least a constitutional unit (first constitutional unit) derived from the first monomer containing at least one of a sulfo group or a salt of a sulfo group and a constitutional unit (second constitutional unit) derived from the second monomer containing an aromatic ring structure and may further include constitutional units derived from other monomers as necessary.

The details and preferred embodiments of the constitutional unit (first constitutional unit) derived from the first monomer containing at least one selected from a sulfo group and a salt of a sulfo group and the second constitutional unit are as described above in the section of the particles of the resin (water-insoluble resin) contained in the overcoat liquid described above.

[Other Additives]

The pre-treatment liquid may contain other additives as necessary. Other additives here are the same as other additives in the ink composition described below.

~Physical Properties of Pre-Treatment Liquid~

1. Surface Tension

The surface tension of the pre-treatment liquid is not particularly limited and can be set to 20 mN/m or greater. From the viewpoint of coating properties with respect to the image recording material, the surface tension thereof is preferably in a range of from 20 mN/m to 60 mN/m and more preferably in a range of from 25 mN/m to 45 mN/m.

The surface tension of the pre-treatment liquid can be measured under a temperature condition of 25° C. using Automatic Surface Tensionmeter CBVP-Z (manufactured by Kyowa Interface Science Co., Ltd.) according to a plate method.

The surface tension of the pre-treatment liquid can be adjusted by adding a surfactant to the pre-treatment liquid.

2. pH

From the viewpoint of the aggregation rate of the ink composition, the pH (25° C.±1° C.) of the pre-treatment liquid is preferably 7.0 or less, more preferably in a range of from 0.5 to 3.5, and still more preferably in a range of from 0.5 to 2.0.

The pH thereof can be measured using a pH meter WM-50EG (manufactured by DKK-TOA CORPORATION) in a state in which the temperature of the pre-treatment liquid is adjusted to 25° C. under a temperature condition of 25° C.

3. Viscosity

From the viewpoint of the aggregation rate of the ink composition, the viscosity of the pre-treatment liquid is preferably in a range of from 1 mPa·s to 30 mPa·s, more preferably in a range of from 1 mPa·s to 20 mPa·s, still more preferably in a range of from 2 mPa·s to 15 mPa·s, and particularly preferably in a range of from 2 mPa·s to 10 mPa·s.

The viscosity thereof can be measured under a temperature condition of 25° C. using VISCOMETER TV-22 (manufactured by TOKI SANGYO CO., LTD.).

<Image Forming Method>

An image forming method according to an embodiment of the present invention includes a step of applying a pre-treatment liquid which contains an acid and water to an image recording material (hereinafter, also referred to as a pre-treatment step); a step of applying an ink composition which contains a colorant and water to the surface of the image recording material, to which the pre-treatment liquid is applied, to form an image (hereinafter, also referred to as an image forming step); and a step of applying an overcoat liquid which contains water and particles of a resin containing an acidic group selected from the group consisting of a sulfo group, a salt of a sulfo group, a phosphonic acid group, a salt of a phosphonic acid group, a phosphoric acid group, and a salt of a phosphoric acid group to at least a part of the side of the image recording material, on which the image is formed (hereinafter, also referred to as an overcoat liquid applying step). Further, the image forming method according to the embodiment of the present invention may further include other steps as necessary.

According to the image forming method of the embodiment of the present invention, since an image is overcoated using the above-described ink set at the time of image formation, the glossiness of the surface on which the image is formed becomes excellent even in a case where the image is formed using an acid-containing treatment liquid.

As the image recording material, a substrate having a contact angle (water contact angle) of 70° or greater when 3 seconds have elapsed from application of water droplets to the surface thereof is preferable. Specific examples of the image recording material include a paper substrate such as coated paper or synthetic paper, and a polymer substrate such as polyethylene terephthalate (PET) film. Among these substrates, from the viewpoint of remarkably exhibiting the effects of suppressing a decrease in density of a solid image portion and streak unevenness (and graininess in some cases), a paper substrate is preferable and a paper substrate (coated paper) having a coating layer is more preferable.

The contact angle between the surface of the image recording material and water can be measured under conditions of a normal temperature and a normal humidity using a contact angle meter DROP MASTER DM700 (manufactured by Kyowa Interface Science Co., Ltd.) in conformity with Japanese Industrial Standards (JIS R3257).

The coated paper is formed by providing a coating layer containing an inorganic pigment and the like on the surface of high-quality paper or neutral paper which includes cellulose serving as a support as a main body and which is not surface-treated. In the coated paper, gloss unevenness tends to occur in an image portion, but the occurrence of the gloss unevenness in the image portion can be effectively suppressed in a case where the pre-treatment liquid contains phosphoric acid or a phosphoric acid compound. Specific examples of the coated paper include art paper, coated paper, light weight paper, and fine coating paper.

The inorganic pigment contained in the coating layer is not particularly limited, but at least one selected from silica, kaolin, clay, baked clay, zinc oxide, tin oxide, magnesium sulfate, aluminum oxide, aluminum hydroxide, psuedoboehmite, calcium carbonate, sachin white, aluminum silicate, smectite, zeolite, magnesium silicate, magnesium carbonate, magnesium oxide, and diatomaceous earth is preferable and calcium carbonate, silica, and kaoline are more preferable.

As the image recording material, commercially available products can be typically used, and examples thereof include "BON IVORY (manufactured by OJI PAPER CO., LTD.) "MagnoStarGloss" (manufactured by Sappi), "CarolinaC2S" (manufactured by International Company), "CartaIntegra" (manufactured by Metsaboard), and "VJFP series" (manufactured by YUPO).

In the embodiment of the present invention, it is preferable that the amount of the pre-treatment liquid to be applied and the amount of the ink composition to be applied as necessary. For example, in order to adjust the physical properties such as the viscoelasticity of an aggregate formed by the pre-treatment liquid and the ink composition being mixed with each other, the amount of the pre-treatment liquid to be applied may be changed depending on the image recording material.

—Pre-Treatment Step—

The pre-treatment step of the embodiment is a step of applying the pre-treatment liquid containing an acid and water to the image recording material.

The pre-treatment liquid can be applied using a known method such as a coating method, an inkjet method, or an immersion method. Examples of the known coating method include an extrusion die coater, an air doctor coater, a blade coater, a rod coater, a knife coater, a squeeze coater, a reverse roll coater, and a bar coater. The details of the inkjet method will be described below.

The pre-treatment step is performed before the image forming step for which the ink composition is used. In other words, before the ink composition is applied onto the image recording material, the pre-treatment liquid for aggregating dispersion components (a colorant and the like) in the ink composition is applied in advance, and the ink composition is applied such that the ink composition comes into contact with the pre-treatment liquid applied onto the image recording material to obtain an image. In this manner, inkjet recording can be carried out at a high speed and a high-resolution image with a high density can be obtained even when the recording is carried out at a high speed.

Further, it is preferable that the pre-treatment liquid on the image recording material is heated and dried from when the pre-treatment liquid is applied onto the image recording material to when the ink composition is applied. In this manner, ink colorability such as bleeding prevention becomes excellent and a visible image with an excellent color density and excellent hue can be recorded.

The pre-treatment liquid is heated and dried using known heating means such as a heater, blast means for blasting such as a dryer, or a combination of these known heating means and blast means.

Examples of the heating method include a method of applying heat using a heater or the like from a side opposite to a side of the image recording material to which the pre-treatment liquid has been applied, a method of blowing warm air or hot air to the surface of the image recording material to which the pre-treatment liquid has been applied, and a heating method using an infrared heater. Further, the heating may be carried out by a method of combining a plurality of methods of these.

—Image Forming Step—

During the image forming step of the present embodiment, an image is formed by applying the ink composition containing a colorant and water to the surface of the image recording material to which the pre-treatment liquid has been applied during the pre-treatment step.

The inkjet method is not particularly limited, and examples thereof include known methods such as a electrostatic charge control method of ejecting an ink using electrostatic attraction force; a drop-on-demand method (pressure pulses method) using a vibration pressure of a piezoelectric element; an acoustic inkjet method of ejecting an ink using a radiation pressure by changing an electric signal into an acoustic beam and applying the acoustic beam to the ink; and a thermal inkjet (bubble jet (registered trademark)) method of heating an ink to form bubbles and utilizing the generated pressure. As the inkjet method, particularly, an inkjet method, described in JP1979-59936A (JP-S54-59936A), of ejecting an ink from a nozzle using an action force caused by a rapid change in volume of the ink after being subjected to an action of thermal energy.

Further, examples of the inkjet method include a method of ejecting a small volume of an ink having a low concentration, which is referred to as a photo ink, multiple times, a method of improving the image quality using a plurality of inks having substantially the same hue and different concentrations, and a method of using a colorless transparent ink.

Further, an inkjet head used in the inkjet method may be operated by an on-demand system or a continuous system. Specific examples of the ejection system include an electromechanical conversion system (such as a single cavity type, a double cavity type, a bender type, a piston type, a share mode type, or a shared wall type), an electrothermal conversion system (such as a thermal inkjet type or a bubble jet (registered trademark) type), an electrostatic attraction system (such as an electric field control type or a slit jet type), and an electrical ejection system (such as a spark jet type), and any ejection system may be used.

The ink nozzle used at the time of recording according to the inkjet method is not particularly limited and can be selected as appropriate depending on the purpose thereof.

A short serial head is used as the inkjet head, and there are two systems for the inkjet head, which are a shuttle system of performing recording while scanning a head in the width direction of the image recording material and a line system of using a line head in which recording elements are disposed corresponding to the entire area of one side of the image recording material. In the line system, image recording can be performed on the entire surface of the image recording material by scanning the image recording material in a direction orthogonal to the direction in which the recording elements are disposed. Therefore, a conveying system such as a carriage that scans a short head becomes unnecessary. Further, since movement of a carriage and complicated scanning control between the head and the image recording material become unnecessary and only the image recording material moves, the recording can be performed at a higher speed compared to the shuttle system.

It is preferable that the image forming step is started within 10 seconds after the pre-treatment step and more preferable that the image forming step is started within a time range of 0.1 seconds to 10 seconds. In this manner, an image can be formed at a high speed. The expression "started within 10 seconds after the pre-treatment step" means that the time taken from when the pre-treatment liquid is applied and the drying is completed to when the first ink droplet is impacted on the image recording material is within 10 seconds.

Further, in the image forming step, the droplet amount of ink droplets to be applied (ejected) is preferably in a range of from 1.5 pL (pico liter) to 3.0 pL and more preferably in a range of from 1.5 pL to 2.5 pL from the viewpoint of a printed image with high resolution.

In addition, the droplet amount of the ink droplets can be adjusted by selecting the ejection conditions in the inkjet method as appropriate depending on the ink composition to be ejected.

[Heating and Fixing Step]

The image forming method may further include a heating and fixing step of heating and fixing an image recorded by performing the pre-treatment step and the image forming step. An image on the image recording material is fixed and the rub resistance of the image is further improved by performing such heating and fixing.

In a case where the ink composition contains resin particles, it is preferable that the heating in the heating and fixing step is performed at a temperature higher than or equal to the minimum filming temperature (MFT) of the resin particles in the image. When the heating is performed at MFT or higher, the resin particles are formed into a film so that the rub resistance of the image is improved.

In a case where an image is heated and pressed at the same time, the pressure at the time of pressing the image is preferably in a range of from 0.1 MPa to 3.0 MPa, more preferably in a range of from 0.1 MPa to 1.0 MPa, and still more preferably in a range of from 0.1 MPa to 0.5 MPa from the viewpoint of making the surface smooth.

The heating method is not particularly limited, and preferred examples thereof include drying methods in a non-contact manner such as a heating method using a heating element such as a nichrome wire heater, a method of supplying warm air or hot air, and a heating method using a halogen lamp and an infrared lamp.

Further, the heating and pressing method is not particularly limited, and preferred examples thereof include methods of performing heating and fixing in a contact manner such as a method of pressing a hot plate to a surface of the image recording material on which an image is formed; and a method of passing a pair of rollers or the like using a heating and pressing device that includes a pair of heating and pressing rollers, a pair of heating and pressing belts, or a heating and pressing belt disposed on a surface side of the image recording material on which an image is formed and a holding roller disposed on the opposite side of the surface.

In a case of the heating and the pressing, the nip time is preferably in a range of from 1 millisecond to 10 seconds, more preferably in a range of from 2 milliseconds to 1 second, and still more preferably in a range of from 4 milliseconds to 100 milliseconds. Further, the nip width is preferably in a range of from 0.1 mm to 100 mm, more preferably in a range of from 0.5 mm to 50 mm, and still more preferably in a range of from 1 mm to 10 mm.

As a heating and pressing roller, a metal roller made of a metal or a roller provided with a coating layer that has an elastic member in the vicinity of a core metal made of a metal and a surface layer (or also referred to as a release layer) as necessary may be used. The core metal can be formed of a cylindrical body made of iron, aluminum, stainless steel (SUS), and the like, and it is preferable that at least a part of the surface of the core metal is covered with the coating layer. Particularly, it is preferable that the coating layer is formed of a silicone resin or a fluorine resin having release properties. Further, it is preferable that a heating element is included in the inside of a core metal of one heating and pressing roller, and the heat treatment and the pressure treatment may be performed at the same time by passing the image recording material between the rollers or the heating treatment may be performed by interposing the image recording material between two heating rollers as necessary. As the heating element, a halogen lamp heater, a ceramic heater, and a nichrome wire are preferable.

As a belt substrate that forms a heating and pressing belt used for a heating and pressing device, seamless electroformed nickel is preferable and the thickness of the substrate is preferably in a range of from 10 μm to 100 μm. Further, aluminum, iron, and polyethylene other than nickel can be used as the material of the belt substrate. In a case where a silicone resin or a fluorine resin is provided, the thickness of a layer to be formed using these resins is preferably in a range of from 1 μm to 50 μm and more preferably in a range of from 10 μm to 30 μm.

In order to realize the pressure (nip pressure), an elastic member such as a sprint having a tensile force may be selected and then disposed on both ends of a roller such as a heating and pressing roller such that a desired nip pressure can be obtained by considering the nip gap.

The conveying speed of the image recording material in a case of using a heating and pressing roller or a heating and pressing belt is preferably in a range of from 200 mm/sec to 700 mm/sec, more preferably in a range of from 300 mm/sec to 650 mm/sec, and still more preferably in a range of from 400 mm/sec to 600 mm/sec.

—Overcoating Step—

During the overcoating step of the present embodiment, the overcoat liquid which contains water and particles of a resin containing an acidic group (specific acidic group or the like) selected from the group consisting of a sulfo group, a salt of a sulfo group, a phosphonic acid group, a salt of a phosphonic acid group, a phosphoric acid group, and a salt of a phosphoric acid group is applied to at least a part of the side of the image recording material, on which the image is formed during the image forming step (the heating and fixing step in some cases).

Further, the details and preferred embodiments of the particles, the resin contained in the particles, and the specific acidic group or the like are as described above in the section of the ink set described above.

The overcoat liquid can be applied according to a known method such as a coating method, an inkjet method, or an immersion method. As the coating method, the known coating method exemplified in the section of the pre-treatment step described above can be used.

The overcoat step is provided after the image forming step for which the image composition has been used. In other words, a desired image is formed by applying the ink composition onto the image recording material, and then the overcoat liquid is applied to at least a part (at least a part of the side of the image recording material, on which the image has been formed) of the surface of the image recording material, on which the image has been formed. In this case, only the image portion on the surface on which the image has been formed, only the non-image portion which does not have any formed images, or the entire surface on which the image has been formed may be overcoated with the overcoat liquid. From the viewpoint of the effects, it is preferable that the entire surface on which the image has been formed is overcoated with the overcoat liquid.

In this manner, the gloss of the surface of the image recording material, on which the image has been formed, is effectively improved.

In the overcoating step, the application amount (preferably the coating amount) of the overcoat liquid to be applied (preferably to be coated) is preferably in a range of from 2.0 $g/m^2$ to 6.0 $g/m^2$ and more preferably in a range of from 3.0 $g/m^2$ to 5.0 $g/m^2$, from the viewpoint of excellent glossiness.

EXAMPLES

Embodiments of the present invention will be described in more detail with reference to the examples described below. However, the embodiments of the present invention are not limited to the examples described below unless departing from the scope of the present invention. Further, "part" is on a mass basis unless otherwise noted.

Example 1

<Preparation of Resin Particles>
—Preparation of Water-Insoluble Resin Particles A-1—
8.3 g of sodium dodecyl benzene sulfonate (manufactured by Tokyo Chemical Industry Co., Ltd.) as a surfactant (emulsifying agent) and 400 g of water were added to a 1000 mL three-neck flask provided with a stirrer and a cooling pipe, heated at 80° C. in a nitrogen atmosphere, and both of a solution A obtained by dissolving 0.85 g of potassium peroxodisulfate (potassium persulfate, manufactured by Wako Pure Chemical Industries, Ltd.) as a polymerization initiator and 55.8 g of a 50 mass % aqueous solution (manufactured by Sigma-Aldrich Co. LLC.) of sodium acrylamide-2-propanesulfonate as a raw material monomer in 20 g of water and a solution B obtained by mixing 110.0 g of styrene (manufactured by Wako Pure Chemical Industries, Ltd.) as a raw material monomer and 30.0 g of 2-ethylhexyl acrylate (manufactured by Wako Pure Chemical Industries, Ltd.) were added dropwise to the three-neck flask for 3 hours at the same time. After the dropwise addition, the solution was reacted for 3 hours, thereby obtaining an aqueous dispersion liquid (the amount of the solid content in the particles: 42% by mass) of water-insoluble resin particles A-1.

The volume average particle diameter of the water-insoluble resin particles A-1 in the aqueous dispersion liquid obtained in the above-described manner was 35 nm and the weight-average molecular weight thereof was 50000.

The volume average particle diameter was measured by preparing the aqueous dispersion liquid of the water-insoluble resin particles A-1 in which the concentration of the solid contents was adjusted to 2% by mass and adjusting the liquid temperature to 25° C., using a nanotrac particle size distribution measurement apparatus UPA-EX150 (manufactured by Nikkiso Co., Ltd.) according to a dynamic light scattering method.

The weight-average molecular weight was measured using gel permeation chromatography (GPC).

According to GPC, HLC-8220GPC (manufactured by TOSOH CORPORATION) was used, three columns of TSKgel, Super Multipore HZ-H (manufactured by TOSOH CORPORATION, 4.6 mmID×15 cm) were used as columns, and tetrahydrofuran (THF) was used as an eluant. The weight-average molecular weight was measured under measurement conditions of a sample concentration of 0.45% by mass, a flow rate of 0.35 mL/min, a sample injection amount of 10 µl, and a measurement temperature of 40° C. using a refractive index (RI) detector. Further, the calibration curve was created from 8 samples of "standard samples TSK standard, polystyrene", which are "F-40", "F-20", "F-4", "F-1", "A-5000", "A-2500", "A-1000", and "n-propylbenzene".

—Preparation of water-insoluble resin particles A-2 to A-14—

Aqueous dispersion liquids of water-insoluble resin particles A-2 to A-14 were obtained according to the same method as the method used for preparing the water-insoluble resin particles A-1 except that the surfactant (emulsifying agent) and the raw material monomer used for preparation of the water-insoluble resin particles A-1 were changed as shown in Table 1.

For the preparation of the water-insoluble resin particles A-4, a compound represented by Structural Formula P-1 was used as a surfactant (emulsifying agent).

For the preparation of the water-insoluble resin particles A-8, the aqueous dispersion liquid was obtained without adding a surfactant (emulsifying agent).

Structural Formula P-1

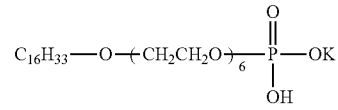

TABLE 1

| | Surface (emulsifying agent) [g] | | | Raw material monomer [g] Solution A | | | |
|---|---|---|---|---|---|---|---|
| | Sodium dodecyl benzene sulfonate | Sodium dodecyl sulfate | Potassium polyoxyethylene alkyl ether phosphate (Structural Formula P-1) | Sodium acrylamide-2-methyl propane sulfonate (50 mass % aqueous solution) | Sodium p-styrene sulfonate | 2-methacryloyloxy ethyl acid phosphate | Acrylic acid |
| A-1 | 8.3 | — | — | 55.8 | — | — | — |
| A-2 | 8.3 | — | — | — | 25.0 | — | — |
| A-3 | — | 6.8 | — | — | 25.0 | — | — |
| A-4 | — | — | 14.8 | — | 25.0 | — | — |
| A-5 | 8.3 | — | — | — | — | 27.7 | — |
| A-6 | 8.3 | — | — | — | 55.0 | — | — |
| A-7 | 8.3 | — | — | — | 2.5 | — | — |
| A-8 | | — | | | 25.0 | — | — |
| A-9 | 0.8 | — | — | — | 25.0 | — | — |
| A-10 | 18.2 | — | — | — | 25.0 | — | — |
| A-11 | 3.3 | — | — | — | 35.0 | — | — |
| A-12 | 14.0 | — | — | — | 10.0 | — | — |
| A-13 | 8.3 | — | — | — | — | — | 25.0 |
| A-14 | 8.3 | — | — | — | — | | |

| | Raw material monomer [g] Solution B | | Mass of solid content | Total content A of specific acidic group or the like in resin (amount per 1 g of resin [mmol/g]) *1 | Total content B of specific acidic group or the like in surfactant (amount per 1 g of resin [mmol/g]) *1 | Ratio B/A |
|---|---|---|---|---|---|---|
| | Styrene | 2-ethylhexyl acrylate | | | | |
| A-1 | 110.0 | 30.0 | 167.9 | 0.72 | 0.14 | 0.20 |
| A-2 | 110.0 | 30.0 | 165.0 | 0.73 | 0.14 | 0.20 |
| A-3 | 110.0 | 30.0 | 165.0 | 0.73 | 0.14 | 0.20 |
| A-4 | 110.0 | 30.0 | 165.0 | 0.73 | 0.14 | 0.20 |
| A-5 | 110.0 | 30.0 | 167.7 | 0.72 | 0.14 | 0.20 |
| A-6 | 80.0 | 30.0 | 165.0 | 1.62 | 0.14 | 0.09 |
| A-7 | 132.5 | 30.0 | 165.0 | 0.07 | 0.14 | 1.95 |
| A-8 | 110.0 | 30.0 | 165.0 | 0.73 | 0 | 0 |
| A-9 | 110.0 | 30.0 | 165.0 | 0.73 | 0.01 | 0.02 |
| A-10 | 110.0 | 30.0 | 165.0 | 0.73 | 0.32 | 0.43 |
| A-11 | 100.0 | 30.0 | 165.0 | 1.03 | 0.06 | 0.06 |
| A-12 | 125.0 | 30.0 | 165.0 | 0.29 | 0.24 | 0.83 |
| A-13 | 110.0 | 30.0 | 165.0 | 0 | 0.14 | |
| A-14 | 129.6 | 35.4 | 165.0 | 0 | 0.14 | |

*1: An acidic group or a salt of the acidic group is selected from the group consisting of a sulfo group, a salt of a sulfo group, a phosphonic acid group, a salt of a phosphonic acid group, a phosphoric acid group, or a salt of a phosphoric acid group.
The details of the components in Table 1 are as follows.
Sodium p-styrene sulfonate: SPINOMAR NaSS, manufactured by TOSOH ORGANIC CHEMICAL CO, LTD.
2-methacryloyloxy ethyl acid phosphate: Light Ester P-1M manufactured by KYOEISHA CHEMICAL Co., Ltd.)

<Preparation of Overcoat Liquid>
—Preparation of Overcoat Liquid 1—
An overcoat liquid 1 was prepared by mixing respective components in the composition.
<Composition>
Aqueous dispersion liquid of water-insoluble resin particles A-1 described above . . . 75% by mass
Wax dispersion . . . 15% by mass (AQUACER (registered trademark) 531, manufactured by BYK Chemie GmbH)
Isopropyl alcohol (IPA) . . . 3% by mass
Butyl carbitol . . . 1% by mass
Sodium di-2-ethylhexyl sulfosuccinate . . . 1% by mass (surfactant represented by Formula (2))
Ion exchange water . . . total amount of 100% by mass
—Preparation of Overcoat Liquids 2 to 14—
Overcoat liquids 2 to 14 were prepared in the same manner as the preparation of the overcoat liquid 1 except that the aqueous dispersion liquid of the water-insoluble resin particles A-1 was replaced with any of aqueous dispersion liquids of the water-insoluble resin particles A-2 to A-14 in the preparation of the overcoat liquid 1.

<Preparation of Pre-Treatment Liquid 1>
Respective components in the following composition were mixed to prepare a pre-treatment liquid 1.
<Composition>
Diethylene glycol monoethyl ether . . . 4% by mass
Tripropylene glycol monomethyl ether . . . 4% by mass
Malonic acid (organic acid) . . . 17.3% by mass
Propanetricarboxylic acid (organic acid) . . . 4.3% by mass
Phosphoric acid (inorganic acid) . . . 4.3% by mass
Water-insoluble resin particles C-1 described below . . . 5.0% by mass
Benzotriazole . . . 1% by mass
Anti-foaming agent . . . amount in which the mass of silicone oil becomes 100 ppm (TSA-739 (solid content of 15% by mass), manufactured by Momentive Performance Materials Inc., emulsion type silicon anti-foaming agent)
Ion exchange water . . . total amount of 100% by mass
—Preparation of Water-Insoluble Resin Particles C-1—
1.5 g of a 62 mass % aqueous solution (manufactured by Tokyo Chemical Industry Co., Ltd.) of sodium dodecyl benzene sulfonate and 350 g of water were added to a 1000 mL three-neck flask provided with a stirrer and a cooling pipe, heated at 80° C. in a nitrogen atmosphere, and both of a solution A obtained by dissolving 0.85 g of potassium peroxodisulfate (potassium persulfate, manufactured by Wako Pure Chemical Industries, Ltd.) as a polymerization initiator and 12.4 g of a 50 mass % aqueous solution (manufactured by Sigma-Aldrich Co. LLC.) of sodium acrylamide-2-propanesulfonate as a raw material monomer in 20 g of water and a solution B obtained by mixing 14.9 g of styrene (manufactured by Wako Pure Chemical Industries, Ltd.) as a raw material monomer, 12.2 g of methyl methacrylate (manufactured by Wako Pure Chemical Industries, Ltd.), 15.4 g of methacrylic acid (manufactured by Wako Pure Chemical Industries, Ltd.) were added dropwise to the three-neck flask for 3 hours at the same time. After the dropwise addition, the solution was reacted for 3 hours, thereby obtaining 427 g of an aqueous dispersion liquid (the amount of the solid content in the particles: 11.4% by mass) of water-insoluble resin particles C-1.

The volume average particle diameter of the water-insoluble resin particles C-1 in the aqueous dispersion liquid obtained in the above-described manner was 32 nm and the weight-average molecular weight thereof was 135000.

<Preparation of Ink Composition>

(Synthesis of Polymer Dispersing Agent P-1)

A polymer dispersing agent P-1 was synthesized in the following manner according to the following scheme.

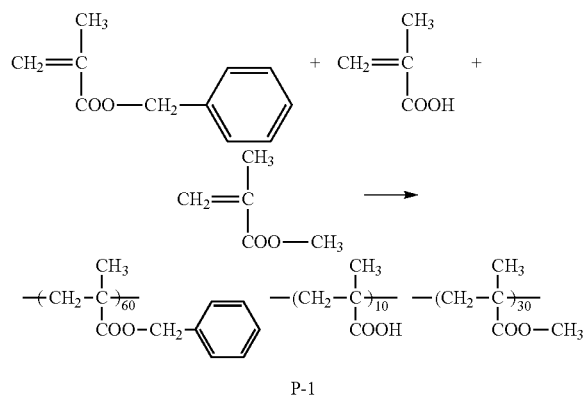

P-1

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise to the three-neck flask for 3 hours. After the dropwise addition, the solution was reacted for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was re-precipitated in an excessive amount of hexane twice, and the deposited resin was dried, thereby synthesizing 96 g of a polymer dispersing agent P-1.

Further, the numerical values of each constitutional unit of the polymer dispersing agent P-1 described above indicate the "mass ratios".

The composition of the obtained polymer dispersing agent P-1 was confirmed using proton nuclear magnetic resonance spectroscopy ($^1$H-NMR), and the weight-average molecular weight (Mw) acquired by GPC was 44600. Further, the acid value acquired by the method in conformity with JIS standard (JISK0070:1992) was 65.2 mgKOH/g.

(Preparation of Pigment Dispersion Liquid)

—Preparation of Cyan Pigment Dispersion Liquid—

10 parts of Pigment Blue 15:3 (phthalocyanine blue A220, manufactured by Dainichiseika Color & Chemicals Mfg. Co., Ltd.) which is a cyan pigment, 5 parts of a polymer dispersing agent P-1, 42 parts of methyl ethyl ketone, 5.5 parts of a 1×10$^3$ mol/L sodium hydroxide aqueous solution (NaOH aqueous solution; the same applies to hereinafter), and 87.2 parts of ion exchange water were mixed and dispersed using zirconia beads having a diameter of 0.1 mm for 2 to 6 hours by utilizing a bead mill.

After methyl ethyl ketone was removed and some water was removed from the obtained dispersion under reduced pressure at 55° C., a centrifugation treatment was performed at a rotation speed of 8000 rpm for 30 minutes using a high-speed centrifugal cooling machine 7550 (manufactured by KUBOTA CORPORATION) and a 50 mL centrifuge pipe. After the stretching treatment, the supernatant other than the precipitate was recovered. Thereafter, the pigment concentration was acquired from the absorbance spectrum and then a dispersion (a cyan pigment dispersion liquid C) of resin-coated pigment particles (a pigment covered with a polymer dispersing agent) having a pigment concentration of 10.2% by mass was obtained. The average particle diameter of the resin-coated pigment particles of the obtained cyan dispersion liquid C was 105 nm. Further, the average particle diameter was measured using a known method.

—Preparation of Magenta Pigment Dispersion Liquid—

A dispersion (a magenta pigment dispersion liquid M) of resin-coated pigment particles (a pigment covered with a polymer dispersing agent) was prepared in the same manner as in the preparation of the cyan pigment dispersion liquid except that Pigment Red 122 (Chromofine Magenta 6886, manufactured by Dainichiseika Color & Chemicals Mfg. Co., Ltd.) which is a magenta pigment was used in place of Pigment Blue 15:3 (phthalocyanine blue A220).

The average particle diameter of the resin-coated pigment particles of the obtained magenta pigment dispersion liquid M was 85 nm. Further, the average particle diameter was measured using a known method.

—Preparation of Yellow Dispersion Liquid—

A dispersion (a yellow pigment dispersion liquid Y) of resin-coated pigment particles (a pigment covered with a polymer dispersing agent) was prepared in the same manner as in the preparation of the cyan pigment dispersion liquid except that Pigment Yellow 74 (Seika Fast Yellow 2054, manufactured by Dainichiseika Color & Chemicals Mfg. Co., Ltd.) which is a yellow pigment was used in place of Pigment Blue 15:3 (phthalocyanine blue A220) in the preparation of the cyan pigment dispersion liquid.

The average particle diameter of the resin-coated pigment particles of the obtained yellow pigment dispersion liquid Y was 82 nm. Further, the average particle diameter was measured using a known method.

—Preparation of Black Dispersion Liquid—

A dispersion (a black pigment dispersion liquid K) of resin-coated pigment particles (a pigment covered with a polymer dispersing agent) was prepared in the same manner as in the preparation of the cyan pigment dispersion liquid except that carbon black (NIPEX1604Q, manufactured by Degussa AG) which is a black pigment was used in place of Pigment Blue 15:3 (phthalocyanine blue A220) in the preparation of the cyan pigment dispersion liquid.

The average particle diameter of the resin-coated pigment particles of the obtained black pigment dispersion liquid K was 130 nm. Further, the average particle diameter was measured using a known method.

(Preparation of Resin Particles)

360.0 g of methyl ethyl ketone was put into a 2 L three-neck flask provided with a stirrer, a thermometer, a reflux cooling pipe, and a nitrogen gas introduction pipe and heated to 75° C. While the temperature inside the reaction container was maintained to 75° C., a mixed solution obtained by mixing 180.0 g of phenoxyethyl acrylate, 162.0 g of methyl methacrylate, 18.0 of acrylic acid, 72 g of methyl ethyl ketone, and 1.44 g of "V-601" (manufactured by Wako Pure Chemical Industries, Ltd., polymerization initiator) was added dropwise at a constant speed such that the dropwise addition was completed within 2 hours. After the dropwise addition was completed, a mixed solution of 0.72 g of "V-601" and 36.0 g of methyl ethyl ketone was added thereto, the mixed solution was stirred at 75° C. for 2 hours, a mixed solution of 0.72 g of "V-601" and 36.0 g of isopropanol was added thereto, and the solution was stirred at 75° C. for 2 hours and heated to 85° C., and then the solution was continuously stirred for 2 hours. In this manner, a polymer solution was obtained.

The weight-average molecular weight (Mw) of the copolymer contained in the obtained polymer solution was 64000 and the acid value thereof was 38.9 mgKOH/g. The acid value and the weight-average molecular weight were measured using known methods.

Next, 668.3 g of a polymer solution was weighed, 388.3 g of isopropanol and 145.7 mL of a 1 mol/L NaOH aqueous solution was added thereto, and the temperature inside of the reaction container was heated to 80° C. Next, 720.1 g of distilled water was added dropwise to the reaction container at a rate of 20 mL/min and dispersed in water. Thereafter, the temperature inside the reaction container was maintained at 80° C. for 2 hours, 85° C. for 2 hours, and 90° C. for 2 hours under the atmospheric pressure, the pressure inside the reaction container was reduced, and 913.7 g of isopropanol, methyl ethyl ketone, and distilled water in total were distilled off. In this manner, an aqueous dispersion (emulsion) of resin particles (B-01) having a concentration of solid contents of 28.0% by mass was obtained.

Further, the numerical values of each constitutional unit in the resin of resin particles (B-01) in the formula shown below indicate the "mass ratios".

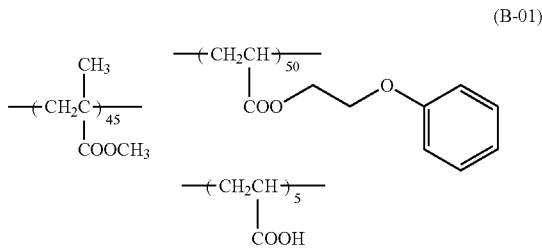

(B-01)

(Preparation of Ink 1)

Respective components were mixed to obtained the ink compositions listed in Table 2 and ink compositions (magenta ink composition M1, black ink composition K1, cyan ink composition C1, and yellow ink composition Y1) were respectively prepared using each of the pigment dispersion liquids obtained in the above-described manner (cyan pigment dispersion liquid C, magenta pigment dispersion liquid M, yellow pigment dispersion liquid Y, and black pigment dispersion liquid K), and resin particles (B-01).

Each of the prepared ink compositions was filtered by a polyfluoride vinylidene (PVDF) filter having a pore size of 5 μm (Millex SV, manufactured by Merck Millipore Corporation, diameter of 25 mm) using a plastic disposable syringe to obtain an ink 1 formed of four colors of inks (magenta ink M1, black ink K1, cyan ink C1, and yellow ink Y1).

TABLE 2

| | | Ink 1 | | | |
|---|---|---|---|---|---|
| Ink composition | | M1 | K1 | C1 | Y1 |
| Ink composition (% by mass) | Magenta pigment (Pigment Red 122) | 4 | — | — | — |
| | Black pigment (carbon black) | — | 4 | — | — |
| | Cyan pigment (Pigment Blue 15:3) | — | — | 4 | — |
| | Yellow Pigment (Pigment Yellow 74) | — | — | — | 4 |
| | Pigment dispersing agent (polymer dispersing agent P-1) | 2 | 2 | 2 | 2 |
| | SANNIX GP-250 | 10 | 10 | 10 | 10 |
| | Tripropylene glycol monomethyl ether | 5 | 5 | 5 | 5 |
| | Olefin E1010 | 1 | 1 | 1 | 1 |
| | Resin particles (B-01) | 8 | 8 | 8 | 8 |
| | water | 70 | 70 | 70 | 70 |

Hereinafter, the details of the components listed in Table 2 are described.
SANNIX GP-250 . . . organic solvent (manufactured by SANYO CHEMICAL INDUSTRIES, LTD.)
Olefin E1010 . . . non-ionic surfactant (manufactured by Nissin Chemical Industry Co., Ltd.)

Examples 1 to 12 and Comparative Examples 1 and 2

Ink sets 1 to 14 listed in Table 3 were prepared using the ink 1, the pre-treatment liquid 1, and the overcoat liquids 1 to 14 which were prepared in the above-described manners.

Images were formed by the following procedures using these ink sets 1 to 14 and then evaluated.

—Image Formation—

An image was formed using coated paper (BON IVORY (310 g/m$^2$), manufactured by OJI PAPER CO., LTD.; coated paper) as a substrate, which was an image recording material, according to the following method. Further, in the image formation, ink ejection was set to be started in the image forming step within 10 seconds after the pre-treatment step.

1. Pre-Treatment Step (Pre-Treatment Process)

The pre-treatment liquid 1 was applied to the substrate using a coating bar immediately before the ink was applied to the substrate. The substrate was coated with the pre-treatment liquid such that the coating amount thereof was set to 1.5 g/m$^2$. Next, the pre-treatment liquid applied to the substrate was dried under the following conditions.

<Conditions (Blast Drying)>

Wind speed: 15 m/s

Temperature and heating method: The pre-treatment liquid was heated using a contact-type planar heater from the rear surface (the surface on the side to which the pre-treatment liquid was not applied) of the substrate such that the surface temperature (the temperature on the side to which the pre-treatment liquid was applied) of the substrate was set to 60°.

Blast area: 450 mm (drying time of 0.7 seconds)

2. Image Forming Step

A multicolor image was formed by ejecting the ink 1 (magenta ink M1, black ink K1, cyan ink C1, and yellow ink Y1) to a side of the substrate to which the pre-treatment liquid was applied under the following conditions according to a single pass method. Specifically, an image was formed by applying (ejecting) each color of ink to the surface of the substrate to which the pre-treatment liquid was applied under the following conditions.

<Conditions>
Head: A head formed by disposing piezo full line heads of 1200 dpi (dot per inch)/20 inch width for 4 colors was used.
Amount of droplets to be ejected: 2.4 pL (pico liter).
Drive frequency: 30 kHz (with a conveying speed of the substrate of 635 mm/sec).

Next, the ink applied to the surface of the substrate to which the pre-treatment liquid was applied was dried under the following conditions.

<Conditions (Blast Drying)>
Wind speed: 15 m/s
Temperature: The substrate was heated using a contact-type planar heater from the rear surface (the surface of the substrate on the side to which the ink was not applied) of the substrate such that the surface temperature (the temperature on the side to which the ink was applied) of the substrate was set to 60°.
Blast area: 640 mm (drying time of 1 second)

3. Heating and Fixing Step

An image formed by applying the ink was heated and fixed under the following conditions using a silicon rubber roller (a hardness of 50° and a nip width of 5 mm). In this manner, a sample having a substrate on which an image was formed was obtained.

<Conditions>
Roller temperature: 90°
Pressure: 0.8 MPa

4. Overcoating Process

After the above-described heating and fixing step was completed, a post-treatment was performed on the surface of the substrate on which an image was formed and then an image sample was prepared by coating the entire surface of the substrate on which an image was formed with any of the overcoat liquids 1 to 14 using a roller coater (Digi Coater POD, manufactured by TOYOTEC Co., Ltd.). The post-treatment was performed by coating the surface of the substrate on which an image was formed with the overcoat liquid with a coating amount of 4.0 g/m$^2$.

Next, the overcoat liquid applied to the surface of the substrate on which an image was formed was dried under the following conditions.

<Conditions>
Temperature: the surface of the substrate was heated using an infrared heater such that the surface temperature was adjusted to 40° C.
Conveying speed: 30 m/min —Evaluation—

The following evaluations were performed on image samples prepared in the above-described manner. The evaluation results were listed in Table 3.

(1. Glossiness)

The glossiness of the surface of the substrate in an image sample, on which an image was formed, was measured from a direction parallel to the direction in which the overcoat liquid was applied and a direction perpendicular to the direction in which the overcoat liquid was applied using a BYK Gardner Tri-gloss meter (manufactured by Toyo Seiki Seisaku-sho, Ltd.), and the glossiness at a reflection angle of 60° was respectively acquired.

<Evaluation 1>

An average value of the measured values in the direction parallel to the direction in which the overcoat liquid was applied and the measured values in the direction perpendicular to the direction in which the overcoat liquid was applied was calculated as the value of the glossiness, and the calculated average value was evaluated as the glossiness based on the following evaluation standard.

<Evaluation Standard>
5: The average value of the glossiness was 60 or greater.
4: The average value of the glossiness was 50 or greater and less than 60.
3: The average value of the glossiness was 40 or greater and less than 50, and an overcoated surface having a high glossiness was obtained.
2: The average value of the glossiness was 30 or greater and less than 40, and an overcoated surface having a high glossiness was not obtained.
1: The average value of the glossiness was less than 30.

<Evaluation 2>

Further, an absolute value in a difference between a measured value p of the glossiness in the direction parallel to the direction in which the overcoat liquid was applied and a measured value q of the glossiness in the direction perpendicular to the direction in which the overcoat liquid was applied was acquired as an index for evaluating the gloss uniformity and the gloss uniformity was evaluated based on the following evaluation standard.

<Evaluation Standard>
5: The absolute value in a difference between the measured value p in the direction parallel to the direction in which the overcoat liquid was applied and the measured value q in the direction perpendicular to the direction in which the overcoat liquid was applied was 0 or greater and less than 5.
4: The absolute value in a difference between the measured value p in the direction parallel to the direction in which the overcoat liquid was applied and the measured value q in the direction perpendicular to the direction in which the overcoat liquid was applied was 5 or greater and less than 10.
3: The absolute value in a difference between the measured value p in the direction parallel to the direction in which the overcoat liquid was applied and the measured value q in the direction perpendicular to the direction in which the overcoat liquid was applied was 10 or greater and less than 15, and this range is practically acceptable.
2: The absolute value in a difference between the measured value p in the direction parallel to the direction in which the overcoat liquid was applied and the measured value q in the direction perpendicular to the direction in which the overcoat liquid was applied was 15 or greater and less than 20, the difference therebetween was clearly observed visually, and this range is not practically acceptable.
1: The absolute value in a difference between the measured value p in the direction parallel to the direction in which the overcoat liquid was applied and the measured value q in the direction perpendicular to the direction in which the overcoat liquid was applied was 20 or greater.

(2. Rub resistance of image)

The surface of the substrate in the image sample, on which an image was formed, was rubbed 10 times by applying a load of 240 g/cm$^2$ using unused coated paper (BON IVORY (310 g/m$^2$), manufactured by OJI PAPER CO., LTD., image recording material) within 10 minutes immediately after the coating and the drying during the overcoating process were completed. Thereafter, the rubbed portion was visually observed and the evaluation was performed based on the following evaluation standard.

<Evaluation standard>5: The rubbed portion was not different from the portion which was not rubbed and no scratches were found.
4: The surface of the rubbed portion was slightly scratched, but the scratch was not severe enough to damage the image, which was not problematic in practical use.
3: The surface of the rubbed portion was slightly peeled off and ultra-thin scratches were found, but the scratches were not at a problematic level in practical use.
2: The surface of the rubbed portion was peeled off and scratches were conspicuous, which was problematic in practical use.
1: The image of the rubbed portion was peeled off and the white background of the coated paper was partially exposed, and this was at a problematic level in practical use.

(3. Water Resistance of Image)

One droplet of ion exchange water was dropped on the surface of the substrate in the image sample, on which the image was formed, within 10 minutes immediately after the coating and the drying during the overcoating process were completed and the droplet was wiped off with a wipe towel after 5 seconds from when one droplet was dropped. The wiped portion was visually observed and the evaluation was performed based on the following evaluation standard.

<Evaluation Standard>
5: The portion to which the ion exchange water adhered was not different from the portion to which the ion exchange water did not adhere and the change was not observed at all.
4: Small marks appeared on the contour portion of the portion to which the ion exchange water adhered, but this not problematic in practical use.
3. Small marks appeared on the entire surface of the portion to which the ion exchange water adhered, but this was acceptable in practical use.
2: Marks clearly appeared on the portion to which the ion exchange water adhered, and this was problematic in practical use.
1: The overcoat was lost from the portion to which the ion exchange water adhered, and this was not acceptable in practical use.

As listed in Table 3, in Examples 1 to 3 in which the water-insoluble resin of the water-insoluble resin particles which were contained in the overcoat liquid had the specific acidic group or the like such as a sulfo group in a molecule and also had the specific acidic group derived from a surfactant which was contained in the particles, the water-insoluble resin had the specific acidic group derived from a surfactant which was contained in the particles, but the glossiness and the gloss uniformity were excellent compared to Comparative Examples 1 and 2 in which the water-insoluble resin did not have the specific acidic group or the like such as a sulfo group. In other words, it was understood that the effect of improving the glossiness can be obtained when both of the specific acidic group or the like of a resin contained in particles and the specific acidic group or the like derived from a surfactant contained in particles are present.

In Example 6 in which the water-insoluble resin contains a large amount of the specific acidic group or the like, the glossiness and the gloss uniformity were excellent, but the amount of the specific acidic group or the like was extremely large so that the specific acidic group or the like was hydrophilized and the water resistance was degraded compared to Example 1. On the contrary, in Example 7 in which the water-insoluble resin contains a small amount of the specific acidic group or the like, the glossiness was likely to be degraded compared to Example 1 or the like.

In Example 10 in which the water-insoluble resin particles contains a large amount of the specific acidic group or the like derived from a surfactant contained in the particles, the glossiness and the gloss uniformity were excellent, but the water resistance was degraded because the amount of the specific acidic group or the like was large. On the contrary, in Examples 8 and 9 in which the water-insoluble resin contains a small amount of the specific acidic group or the like derived from a surfactant contained in the particles, the glossiness and the gloss uniformity were likely to be slightly degraded.

TABLE 3

| | | | | | Overcoat liquid | | | Evaluation | | | |
| --- | --- | --- | --- | --- | --- | --- | --- | --- | --- | --- | --- |
| | Ink set No. | Ink No. | Treatment liquid No. | No. | Water-insoluble resin particles | Total content A of specific acidic group or the like in resin (amount per 1 g of resin [mmol/g]) *1 | Total content B of specific acidic group or the like in surfactant (amount per 1 g of resin [mmol/g]) *1 | Ratio B/A | Glossiness | Gloss uniformity | Rub resistance | Water resistance |
| Example 1 | 1 | 1 | 1 | 1 | A-1 | 0.72 | 0.14 | 0.20 | 5 | 5 | 5 | 5 |
| Example 2 | 2 | 1 | 1 | 2 | A-2 | 0.73 | 0.14 | 0.20 | 5 | 5 | 5 | 5 |
| Example 3 | 3 | 1 | 1 | 3 | A-3 | 0.73 | 0.14 | 0.20 | 5 | 5 | 5 | 5 |
| Example 4 | 4 | 1 | 1 | 4 | A-4 | 0.73 | 0.14 | 0.20 | 5 | 4 | 4 | 4 |
| Example 5 | 5 | 1 | 1 | 5 | A-5 | 0.72 | 0.14 | 0.20 | 4 | 4 | 5 | 5 |
| Example 6 | 6 | 1 | 1 | 6 | A-6 | 1.62 | 0.14 | 0.09 | 5 | 5 | 4 | 3 |
| Example 7 | 7 | 1 | 1 | 7 | A-7 | 0.07 | 0.14 | 1.95 | 3 | 4 | 5 | 5 |
| Example 8 | 8 | 1 | 1 | 8 | A-8 | 0.73 | 0.00 | 0.00 | 3 | 3 | 5 | 5 |
| Example 9 | 9 | 1 | 1 | 9 | A-9 | 0.73 | 0.01 | 0.02 | 4 | 3 | 5 | 5 |
| Example 10 | 10 | 1 | 1 | 10 | A-10 | 0.73 | 0.32 | 0.43 | 5 | 5 | 3 | 3 |
| Example 11 | 11 | 1 | 1 | 11 | A-11 | 1.03 | 0.06 | 0.06 | 5 | 4 | 5 | 4 |
| Example 12 | 12 | 1 | 1 | 12 | A-12 | 0.29 | 0.24 | 0.83 | 4 | 5 | 4 | 4 |
| Comparative Example 1 | 13 | 1 | 1 | 13 | A-13 | 0.00 | 0.14 | | 3 | 1 | 5 | 5 |
| Comparative Example 2 | 14 | 1 | 1 | 14 | A-14 | 0.00 | 0.14 | | 2 | 3 | 3 | 3 |

*1: An acidic group or a salt of the acidic group is selected from the group consisting of a sulfo group, a salt of a sulfo group, a phosphonic acid group, a salt of a phosphonic acid group, a phosphoric acid group, or a salt of a phosphoric acid group.

What is claimed is:

1. An ink set, comprising:
   an ink composition comprising a colorant and water;
   a pre-treatment liquid comprising an organic acidic compound containing a carboxy group, and water; and
   an overcoat liquid comprising water and particles of a resin, the resin comprising a first acidic group selected from the group consisting of a sulfo group, a salt of a sulfo group, a phosphonic acid group, a salt of a phosphonic acid group, a phosphoric acid group, and a salt of a phosphoric acid group,
   wherein the particles respectively comprise, in at least a part of a surface thereof, a surfactant comprising a second acidic group selected from the group consisting of a sulfo group, a salt of a sulfo group, a phosphonic acid group, a salt of a phosphonic acid group, a phosphoric acid group, and a salt of a phosphoric acid group,
   wherein a total content A of the first acidic group is in a range of from 0.10 mmol to 1.8 mmol per 1 g of the resin,
   wherein a total content B of the second acidic group is in a range of from 0.02 mmol to 0.30 mmol per 1 g of the resin, and
   wherein a ratio of the total content B to the total content A is in a range of from 0.1 to 0.8.

2. The ink set according to claim 1, wherein the acidic group included in the resin includes at least one selected from the group consisting of a sulfo group and a salt of a sulfo group.

3. The ink set according to claim 1, wherein the acidic group contained in the surfactant is a sulfo group or a salt of a sulfo group.

4. The ink set according to claim 1, wherein the resin contained in the particles does not contain a carboxy group.

5. An image forming method, comprising:
   applying a pre-treatment liquid comprising an organic acidic compound containing a carboxy group, and water to an image recording material;
   applying, to a surface of the image recording material to which the pre-treatment liquid is applied, an ink composition comprising a colorant and water to form an image; and
   applying, to at least a part of a side of the image recording material on which the image is formed, an overcoat liquid comprising water and particles of a resin, the resin comprising a first acidic group selected from the group consisting of a sulfo group, a salt of a sulfo group, a phosphonic acid group, a salt of a phosphonic acid group, a phosphoric acid group, and a salt of a phosphoric acid group,
   wherein the particles respectively comprise, in at least a part of a surface thereof, a surfactant comprising a second acidic group selected from the group consisting of a sulfo group, a salt of a sulfo group, a phosphonic acid group, a salt of a phosphonic acid group, a phosphoric acid group, and a salt of a phosphoric acid group,
   wherein a total content A of the first acidic group is in a range of from 0.10 mmol to 1.8 mmol per 1 g of the resin,
   wherein a total content B of the second acidic group is in a range of from 0.02 mmol to 0.30 mmol per 1 g of the resin, and
   wherein a ratio of the total content B to the total content A is in a range of from 0.1 to 0.8.

* * * * *